US012317372B2

(12) United States Patent
Xu et al.

(10) Patent No.: US 12,317,372 B2
(45) Date of Patent: May 27, 2025

(54) SIGNALLING OPTIMISATION

(71) Applicant: Nokia Technologies Oy, Espoo (FI)

(72) Inventors: Xiang Xu, Nanjing (CN); Benoist Sebire, Tokyo (JP); Amaanat Ali, Espoo (FI); Philippe Godin, Versailles (FR); Alessio Casati, West Molesey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 342 days.

(21) Appl. No.: 17/759,080

(22) PCT Filed: Feb. 13, 2020

(86) PCT No.: PCT/CN2020/075154
§ 371 (c)(1),
(2) Date: Jul. 19, 2022

(87) PCT Pub. No.: WO2021/159420
PCT Pub. Date: Aug. 19, 2021

(65) Prior Publication Data
US 2023/0239683 A1    Jul. 27, 2023

(51) Int. Cl.
*H04L 12/00* (2006.01)
*H04W 8/24* (2009.01)

(52) U.S. Cl.
CPC ..................... *H04W 8/24* (2013.01)

(58) Field of Classification Search
CPC .......... H04W 8/24; H04W 8/22; H04W 88/14
(Continued)

(56) References Cited

U.S. PATENT DOCUMENTS 8,385,948 B2 * 2/2013 Wigren ................... H04W 8/10
455/457
11,539,818 B2 * 12/2022 Sabella ................. H04L 67/289
(Continued)

FOREIGN PATENT DOCUMENTS

CN        106134277 A  * 11/2016 ........... H04L 41/044
CN        108632811 A     10/2018
(Continued)

OTHER PUBLICATIONS

Hong W et al., Base Station, Has Polymerization Adaptation Layer Function Entity For Changing First Format Data Into Second Format Of User Plane Data, And Radio Access Network For Sending User Plane Data Though Mobile Communication, 2016, 11 pages. (Year: 2016).*

(Continued)

*Primary Examiner* — Frantz Coby
(74) *Attorney, Agent, or Firm* — SQUIRE PATTON BOGGS (US) LLP

(57) ABSTRACT

There is disclosed an apparatus comprising means for performing: receiving first radio capability information from a user equipment, the first radio capability information in a format of a first radio access technology; generating second radio capability information of the user equipment based on the first radio capability information, wherein the second radio capability information is generated in a format of a second radio access technology; and sending the first radio capability information and the second radio capability information to a core network node.

15 Claims, 13 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 12,050,608 | B2* | 7/2024 | Nanda | G06F 16/288 |
| 2009/0116435 | A1* | 5/2009 | Koorapaty | H04L 27/2601 |
| | | | | 370/328 |
| 2016/0142554 | A1* | 5/2016 | Anand | H04M 15/8214 |
| | | | | 455/406 |
| 2017/0164352 | A1* | 6/2017 | Yang | H04W 72/21 |
| 2019/0313239 | A1 | 10/2019 | Horn et al. | |
| 2021/0282101 | A1* | 9/2021 | Fertonani | H04W 56/0005 |
| 2022/0022285 | A1* | 1/2022 | Dowlatkhah | H04W 84/12 |

FOREIGN PATENT DOCUMENTS

| | | | |
|---|---|---|---|
| EP | 3579594 | A1 | 12/2019 |
| WO | WO-2017219205 | A1 * 12/2017 | .......... H04L 41/044 |
| WO | 2018/171721 | A1 | 9/2018 |
| WO | WO-2019032821 | A1 * 2/2019 | .......... H04L 5/0053 |
| WO | 2019/109358 | A1 | 6/2019 |
| WO | 2019/195456 | A1 | 10/2019 |

OTHER PUBLICATIONS

Office action received for corresponding Chinese Patent Application No. 202080096663.1, dated Jan. 20, 2024, 6 pages of office action and no page of translation available.

Office action received for corresponding Korean Patent Application No. 10-2022-7030730, dated Jan. 20, 2024, 5 pages of office action and 5 pages of office action translation available.

Office action received for corresponding Japanese Patent Application No. 2022-548969, dated May 14, 2024, 1 page of office action and 2 pages of translation available.

Office action received for corresponding Chinese Patent Application No. 202080096663.1, dated May 30, 2023, 6 pages of office action and no page of translation available.

Extended European Search Report received for corresponding European Patent Application No. 20918368.0, dated Sep. 22, 2023, 16 pages.

"3rd Generation Partnership Project; Technical Specification Group Services and System Aspects; System Architecture for the 5G System (5GS); Stage 2 (Release 16)", 3GPP TS 23.501, V16.2.0, Sep. 2019, pp. 1-391.

"RAT-Type in RACS Signaling", 3GPP TSG-SA2 Meeting #136-AH, S2-2000846, Samsung, Jan. 13-17, 2020, 4 pages.

"RAT-Type in RACS Signaling", 3GPP TSG-SA2 Meeting #136-AH, S2-2000843, Samsung, Jan. 13-17, 2020, 4 pages.

Office action received for corresponding Japanese Patent Application No. 2022-548969, dated Oct. 24, 2023, 2 pages of office action and 3 pages of translation available.

Office action received for corresponding Indian Patent Application No. 202247051763, dated Dec. 9, 2022, 8 pages.

Rejection Decision received for corresponding Chinese Patent Application No. 202080096663.1, dated Apr. 25, 2024, 5 pages of office action and 4 pages of translation available.

"3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

"Discussion on different radio capability octet values across RATs", SA WG2 Meeting #136AH, S2-2000839, Agenda: 7.10.3, Samsung, Jan. 13-17, 2020, pp. 1-2.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0,Dec. 2019, pp. 1-964.

"3rd Generation Partnership Project; Technical Specification Group Core Network and Terminals; Interface between the UE radio Capability Management Function (UCMF) and the Mobility Management Entity (MME); Stage 3 (Release 16)", 3GPP TS 29.674, V1.0.1, Dec. 2019, pp. 1-28.

"3rd Generation Partnership Project; Technical Specification Group Radio Access Network; Evolved Universal Terrestrial Radio Access Network (E-UTRAN); S1 Application Protocol (S1AP) (Release 16)", 3GPP TS 36.413, V16.0.0, Dec. 2019, pp. 1-390.

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)", 3GPP TS 29.274, V16.2.0, Dec. 2019, pp. 1-402.

"3rd Generation Partnership Project; Technical Specification Group Core Network and Terminals; 5G System; UE Radio Capability Management Services Stage 3 (Release 16)", 3GPP TS 29.673, V1.0.0, Dec. 2019, pp. 1-37.

"3rd Generation Partnership Project; Technical Specification Group Radio Access Network; NG-RAN; NG Application Protocol (NGAP) (Release 16)", 3GPP TS 38.413, V16.0.0, Dec. 2019, pp. 1-335.

International Search Report and Written Opinion received for corresponding Patent Cooperation Treaty Application No. PCT/CN2020/075154, dated Nov. 18, 2020, 9 pages.

Notification of Third Office Action dated Jan. 7, 2025 corresponding to Chinese Patent Application No. 2020800966631, with English translation thereof.

* cited by examiner

|   | Bits |
|---|---|

| Octets | 8 | 7 | 6 | 5 | 4 | 3 | 2 | 1 |
|---|---|---|---|---|---|---|---|---|
| 1 to 2 | colspan="8" Type = xx (decimal) |
| 3 to 4 | colspan="8" Length = n |
| 5 to (n+4) | colspan="8" 2$^{nd}$ UE Radio Access Capability Information |

Fig. 7

SIGNALLING OPTIMISATION

RELATED APPLICATION

This application was originally filed as PCT Application No. PCT/CN2020/075154, filed on Feb. 13, 2020, which is incorporated herein by reference in its entirety.

FIELD

This disclosure relates to communications. More particularly, the present disclosure relates to apparatus, methods and computer programs for signalling optimisation in a communication system.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN), evolved UTRAN (E-UTRAN) and New Radio (NR). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A).

Since introduction of fourth generation (4G) services increasing interest has been paid to the next, or fifth generation (5G) standard. 5G may also be referred to as a New Radio (NR) network.

With the increase in radio capabilities of E-UTRA and NR UEs, the present disclosure has identified that there is a need for an efficient approach to signaling UE capability information over the radio interface.

SUMMARY

According to a first aspect there is provided an apparatus comprising means for performing: receiving first radio capability information from a user equipment, the first radio capability information in a format of a first radio access technology; generating second radio capability information of the user equipment based on the first radio capability information, wherein the second radio capability information is generated in a format of a second radio access technology; and sending the first radio capability information and the second radio capability information to a core network node.

According to some examples, the core network node comprises a Mobility Management Entity or an Access and Mobility Management Function.

According to some examples, the apparatus comprises a source radio access node of the user equipment, the apparatus operating according to the first radio access technology.

According to some examples, the first radio access technology is one of a long term evolution access technology and a new radio access technology, and the second radio access technology is the other of the long term evolution access technology and the new radio access technology.

According to some examples, the means are further configured to perform receiving a radio capability identifier of the user equipment from the core network node, the radio capability identifier associated with both the first radio capability information and the second radio capability information.

According to some examples, the means comprises at least one processor; and at least one memory including program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: receiving first radio capability information from a user equipment, the first radio capability information in a format of a first radio access technology; generating second radio capability information of the user equipment based on the first radio capability information, wherein the second radio capability information is generated in a format of a second radio access technology; and sending the first radio capability information and the second radio capability information to a core network node According to a third aspect there is provided an apparatus comprising means for performing: receiving first radio capability information and second radio capability information of a user equipment from a first radio access network node, the first radio capability information in a format of a first radio access technology and the second radio capability information in a format of a second radio access technology; providing the first radio capability information and the second radio capability information to a User equipment radio Capability Management Function and, in response, receiving a radio capability identifier of the user equipment from the User equipment radio Capability Management Function, the radio capability identifier associated with both the first radio capability information and the second radio capability information; and sending the radio capability identifier of the user equipment to a first radio access network node.

According to some examples, the first radio access network node comprises a source radio access network node of the user equipment.

According to some examples, the apparatus comprises a Mobility Management Entity or an Access and Mobility Management Function.

According to some examples, the first radio access technology is one of a long term evolution access technology and a new radio access technology, and the second radio access technology is the other of the long term evolution access technology and the new radio access technology.

According to some examples, the means comprises at least one processor; and at least one memory including program code, the at least one memory and computer program code configured to, with the at least one processor, cause the performance of the apparatus.

According to a fourth aspect there is provided an apparatus comprising at least one processor; and at least one memory including computer program code; the at least one memory and the computer program code configured to, with the at least one processor, cause the apparatus at least to perform: receiving first radio capability information and second radio capability information of a user equipment from a first radio access network node, the first radio capability information in a format of a first radio access technology and the second radio capability information in a format of a second radio access technology; providing the first radio capability information and the second radio capability information to a User equipment radio Capability Management Function and, in response, receiving a radio capability identifier of the user equipment from the User equipment radio Capability Management Function, the radio capability identifier associated with both the first radio capability information and the second radio capability information; and sending the radio capability identifier of the user equipment to a first radio access network node.

According to a fifth aspect there is provided an apparatus comprising means for performing: initiating a user equipment radio capability information retrieve procedure for a user equipment radio capability identity; and in response to the radio capability retrieve procedure, receiving one or both of first radio capability information of the user equipment and second radio capability information of the user equipment, the first radio capability information in a format of a first radio access technology and the second radio capability information in a format of a second radio access technology.

According to some examples, the means are further configured to perform initiating the radio capability retrieve procedure by sending a request to a core network node.

According to some examples, the apparatus comprises a radio access node of the second radio access technology, or comprises a radio access node of the first radio access technology supporting dual connectivity with a radio access node of the first radio access technology.

According to some examples, the first radio access technology is one of a long term evolution access technology and a new radio access technology, and the second radio access technology is the other of the long term evolution access technology and the new radio access technology.

According to some examples, the means comprises at least one processor; and at least one memory including program code, the at least one memory and computer program code configured to, with the at least one processor, cause the performance of the apparatus.

According to a sixth aspect there is provided an apparatus comprising at least one processor; and at least one memory including computer program code; the at least one memory and the computer program code configured to, with the at least one processor, cause the apparatus at least to perform: initiating a user equipment radio capability information retrieve procedure for a user equipment radio capability identity; and in response to the radio capability retrieve procedure, receiving first radio capability information of the user equipment and second radio capability information of the user equipment, the first radio capability information in a format of a first radio access technology and the second radio capability information in a format of a second radio access technology.

According to a seventh aspect there is provided an apparatus comprising means for performing: sending a request to a User Equipment radio Capability Management Function for radio capability information of a user equipment; in response to the request, receiving one or both of first radio capability information and second radio capability information of the user equipment from the User Equipment radio Capability Management Function, wherein the first radio capability information is in a format of a first radio access technology and the second radio capability information is in a format of a second radio access technology; and sending one or both of the received first radio capability information and second radio capability information to a target radio access node of the user equipment.

According to some examples, the apparatus comprises a Mobility Management Entity or an Access and Mobility Management Function.

According to some examples, the first radio access technology is one of a long term evolution access technology and a new radio access technology, and the second radio access technology is the other of the long term evolution access technology and the new radio access technology.

According to some examples, the means comprises at least one processor; and at least one memory including program code, the at least one memory and computer program code configured to, with the at least one processor, cause the performance of the apparatus.

According to an eighth aspect there is provided an apparatus comprising at least one processor; and at least one memory including computer program code; the at least one memory and the computer program code configured to, with the at least one processor, cause the apparatus at least to perform: sending a request to a User Equipment radio Capability Management Function for radio capability information of a user equipment; in response to the request, receiving first radio capability information and second radio capability information of the user equipment from the User Equipment radio Capability Management Function, wherein the first radio capability information is in a format of a first radio access technology and the second radio capability information is in a format of a second radio access technology; and sending one or both of the received first radio capability information and second radio capability information to a target radio access node of the user equipment.

According to a ninth aspect there is provided an apparatus comprising means for performing: receiving first radio capability information and second radio capability information of a user equipment from a first core network node, wherein the first radio capability information is formatted according to a first radio access technology and the second radio capability information is formatted according to a second radio access technology; causing an association to be made at the apparatus between a radio capability identifier and the first and second radio capability information of the user equipment; storing the association at the apparatus; and in response to receiving a request comprising the radio capability identifier from a second core network node, sending one or both of the first and second radio capability information to the second core network node.

According to some examples, the means is further configured to send the radio capability identifier associated with the first and second radio capability information of the user equipment to the first core network node.

According to some examples, the means is further configured to perform selectively sending one or both of the first and second radio capability information to the second core network node.

According to some examples, the apparatus comprises a User Equipment radio Capability Management Function.

According to some examples, the first radio access technology is one of a long term evolution access technology and a new radio access technology, and the second radio access technology is the other of the long term evolution access technology and the new radio access technology.

According to some examples, the first core network node comprises one of a Mobility Management Entity and an Access and Mobility Management Function, and the second core network node comprises the other of the Mobility Management Entity and an Access and Mobility Management Function.

According to some examples, the means comprises at least one processor; and at least one memory including program code, the at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: receiving first radio capability information and second radio capability information of a user equipment from a first core network node, wherein the first radio capability information is formatted according to a first radio access technology and the second radio capability information is formatted according to a second radio access technology; causing an association to be made at the apparatus between a radio capability identifier and the first and second radio capability information of the user equipment; storing the association at the apparatus; and in response to receiving a request comprising the radio capability identifier from a second core network node, sending one or both of the first and second radio capability information to the second other apparatus.

According to an eleventh aspect there is provided an apparatus comprising means for performing: transmitting first radio capability information and second radio capability information of the apparatus to a radio access node; and wherein the first radio capability information is in a format of a first radio access technology and the second radio capability information is in a format of a second radio access technology.

According to some examples, the transmitting is in response to a request received from the radio access node.

According to some examples, the apparatus comprises a user equipment.

According to some examples, the first radio access technology is one of a long term evolution access technology and a new radio access technology, and the second radio access technology is the other of the long term evolution access technology and the new radio access technology.

According to some examples, the means comprises at least one processor; and at least one memory including program code, the at least one memory and computer program code configured to, with the at least one processor, cause the performance of the apparatus.

According to a twelfth aspect there is provided an apparatus comprising at least one processor; and at least one memory including computer program code; the at least one memory and the computer program code configured to, with the at least one processor, cause the apparatus at least to perform: transmitting first radio capability information and second radio capability information of the apparatus to a radio access node; and wherein the first radio capability information is in a format of a first radio access technology and the second radio capability information is in a format of a second radio access technology.

According to a thirteenth aspect there is provided a method comprising: receiving first radio capability information from a user equipment, the first radio capability information in a format of a first radio access technology; generating second radio capability information of the user equipment based on the first radio capability information, wherein the second radio capability information is generated in a format of a second radio access technology; and sending the first radio capability information and the second radio capability information to a core network node.

According to some examples, the core network node comprises a Mobility Management Entity or an Access and Mobility Management Function.

According to some examples, the method is performed by an apparatus comprising a source radio access node of the user equipment, the apparatus operating according to the first radio access technology.

According to some examples, the first radio access technology is one of a long term evolution access technology and a new radio access technology, and the second radio access technology is the other of the long term evolution access technology and the new radio access technology.

According to some examples, the method comprises receiving a radio capability identifier of the user equipment from the core network node, the radio capability identifier associated with both the first radio capability information and the second radio capability information.

According to a fourteenth aspect there is provided a method comprising: receiving first radio capability information and second radio capability information of a user equipment from a first radio access network node, the first radio capability information in a format of a first radio access technology and the second radio capability information in a format of a second radio access technology; providing the first radio capability information and the second radio capability information to a User equipment radio Capability Management Function and, in response, receiving a radio capability identifier of the user equipment from the User equipment radio Capability Management Function, the radio capability identifier associated with both the first radio capability information and the second radio capability information; and sending the radio capability identifier of the user equipment to a first radio access network node.

According to some examples the first radio access network node comprises a source radio access network node of the user equipment.

According to some examples the method is performed by an apparatus comprising a Mobility Management Entity or an Access and Mobility Management Function.

According to some examples, the first radio capability information is encoded in one of a long term evolution format and a new radio format, and the second radio capability information is encoded in the other of the long term evolution format and the new radio format.

According to a fifteenth aspect there is provided a method comprising: at an apparatus, initiating a user equipment radio capability information retrieve procedure for a user equipment radio capability identity; and in response to the radio capability retrieve procedure, receiving one or both of first radio capability information of the user equipment and second radio capability information of the user equipment, the first radio capability information in a format of a first radio access technology and the second radio capability information in a format of a second radio access technology.

According to some examples the method comprises initiating the radio capability retrieve procedure by sending a request to a core network node.

According to some examples the apparatus comprises a radio access node of the first radio access technology.

According to some examples the first radio access technology is one of a long term evolution access technology and a new radio access technology, and the second radio access technology is the other of the long term evolution access technology and the new radio access technology.

According to a sixteenth aspect there is provided a method comprising: sending a request to a User Equipment radio Capability Management Function for radio capability information of a user equipment; in response to the request, receiving one or both of first radio capability information and second radio capability information of the user equipment from the User Equipment radio Capability Management Function, wherein the first radio capability information is in a format of a first radio access technology and the second radio capability information is in a format of a second radio access technology; and sending one or both of the received first radio capability information and second radio capability information to a target radio access node of the user equipment.

According to some examples the method is performed by an apparatus comprising a Mobility Management Entity or an Access and Mobility Management Function.

According to some examples, the first radio access technology is one of a long term evolution access technology and a new radio access technology, and the second radio access technology is the other of the long term evolution access technology and the new radio access technology.

According to a seventeenth aspect there is provided a method comprising: at an apparatus, receiving first radio capability information and second radio capability information of a user equipment from a first core network node, wherein the first radio capability information is formatted according to a first radio access technology and the second radio capability information is formatted according to a second radio access technology; causing an association to be made at the apparatus between a radio capability identifier and the first and second radio capability information of the user equipment; storing the association at the apparatus; and in response to receiving a request comprising the radio capability identifier from a second core network node, sending one or both of the first and second radio capability information to the second other apparatus.

According to some examples the method comprises sending the radio capability identifier associated with the first and second radio capability information of the user equipment to the first core network node.

According to some examples the method comprises selectively sending one or both of the first and second radio capability information to the second core network node.

According to some examples, the method is performed by an apparatus comprising a User Equipment radio Capability Management Function.

According to some examples the first radio access technology is one of a long term evolution access technology and a new radio access technology, and the second radio access technology is the other of the long term evolution access technology and the new radio access technology.

According to some examples, the first core network node and the second core network node comprise one of a Mobility Management Entity and an Access and Mobility Management Function.

According to an eighteenth aspect there is provided a method comprising: at an apparatus, transmitting first radio capability information and second radio capability information of the apparatus to a radio access node; and wherein the first radio capability information is in a format of a first radio access technology and the second radio capability information is in a format of a second radio access technology.

According to some examples the transmitting is in response to a request received from the radio access node.

According to some examples the apparatus comprises a user equipment.

According to some examples the first radio access technology is one of a long term evolution access technology and a new radio access technology, and the second radio access technology is the other of the long term evolution access technology and the new radio access technology.

According to a nineteenth aspect there is provided a computer program comprising instructions for causing an apparatus to perform at least the following: receiving first radio capability information from a user equipment, the first radio capability information in a format of a first radio access technology; generating second radio capability information of the user equipment based on the first radio capability information, wherein the second radio capability information is generated in a format of a second radio access technology; and sending the first radio capability information and the second radio capability information to a core network node.

According to a twentieth aspect there is provided a non-transitory computer readable medium comprising program instructions for causing an apparatus to perform at least the following: receiving first radio capability information from a user equipment, the first radio capability information in a format of a first radio access technology; generating second radio capability information of the user equipment based on the first radio capability information, wherein the second radio capability information is generated in a format of a second radio access technology; and sending the first radio capability information and the second radio capability information to a core network node.

According to a twenty first aspect there is provided a computer program comprising instructions for causing an apparatus to perform at least the following: receiving first radio capability information and second radio capability information of a user equipment from a first radio access network node, the first radio capability information in a format of a first radio access technology and the second radio capability information in a format of a second radio access technology; providing the first radio capability information and the second radio capability information to a User equipment radio Capability Management Function and, in response, receiving a radio capability identifier of the user equipment from the User equipment radio Capability Management Function, the radio capability identifier associated with both the first radio capability information and the second radio capability information; and sending the radio capability identifier of the user equipment to a first radio access network node.

According to a twenty second aspect there is provided a non-transitory computer readable medium comprising program instructions for causing an apparatus to perform at least the following: receiving first radio capability information and second radio capability information of a user equipment from a first radio access network node, the first radio capability information in a format of a first radio access technology and the second radio capability information in a format of a second radio access technology; providing the first radio capability information and the second radio capability information to a User equipment radio Capability Management Function and, in response, receiving a radio capability identifier of the user equipment from the User equipment radio Capability Management Function, the radio capability identifier associated with both the first radio capability information and the second radio capability information; and sending the radio capability identifier of the user equipment to a first radio access network node.

According to a twenty third aspect there is provided a computer program comprising instructions for causing an apparatus to perform at least the following: initiating a user equipment radio capability information retrieve procedure for a user equipment registering with the apparatus; and in response to the radio capability retrieve procedure, receiving one or both of first radio capability information of the user equipment and second radio capability information of the user equipment, the first radio capability information in a format of a first radio access technology and the second radio capability information in a format of a second radio access technology.

According to a twenty fourth aspect there is provided a computer program comprising instructions stored thereon for performing at least the following: initiating a user equipment radio capability information retrieve procedure for a user equipment registering with an apparatus; and in response to the radio capability retrieve procedure, receiving one or both of first radio capability information of the user equipment and second radio capability information of the user equipment, the first radio capability information in a format of a first radio access technology and the second radio capability information in a format of a second radio access technology.

According to a twenty fifth aspect there is provided a non-transitory computer readable medium comprising program instructions for causing an apparatus to perform at least the following: initiating a user equipment radio capability information retrieve procedure for a user equipment registering with the apparatus; and in response to the radio capability retrieve procedure, receiving one or both of first radio capability information of the user equipment and second radio capability information of the user equipment, the first radio capability information in a format of a first radio access technology and the second radio capability information in a format of a second radio access technology.

According to a twenty sixth aspect there is provided a non-transitory computer readable medium comprising program instructions stored thereon for performing at least the following: initiating a user equipment radio capability information retrieve procedure for a user equipment registering with an apparatus; and in response to the radio capability retrieve procedure, receiving one or both of first radio capability information of the user equipment and second radio capability information of the user equipment, the first radio capability information in a format of a first radio access technology and the second radio capability information in a format of a second radio access technology.

According to a twenty seventh aspect there is provided a computer program comprising instructions for causing an apparatus to perform at least the following: sending a request to a User Equipment radio Capability Management Function for radio capability information of a user equipment; in response to the request, receiving one or both of first radio capability information and second radio capability information of the user equipment from the User Equipment radio Capability Management Function, wherein the first radio capability information is in a format of a first radio access technology and the second radio capability information is in a format of a second radio access technology; and sending one or both of the received first radio capability information and second radio capability information to a target radio access node of the user equipment.

According to a twenty eighth aspect there is provided a non-transitory computer readable medium comprising program instructions for causing an apparatus to perform at least the following: sending a request to a User Equipment radio Capability Management Function for radio capability information of a user equipment; in response to the request, receiving one or both of first radio capability information and second radio capability information of the user equipment from the User Equipment radio Capability Management Function, wherein the first radio capability information is in a format of a first radio access technology and the second radio capability information is in a format of a second radio access technology; and sending one or both of the received first radio capability information and second radio capability information to a target radio access node of the user equipment.

According to a twenty ninth aspect there is provided a computer program comprising instructions for causing an apparatus to perform at least the following: receiving first radio capability information and second radio capability information of a user equipment from a first core network node, wherein the first radio capability information is formatted according to a first radio access technology and the second radio capability information is formatted according to a second radio access technology; causing an association to be made at the apparatus between a radio capability identifier and the first and second radio capability information of the user equipment; storing the association at the apparatus; and in response to receiving a request comprising the radio capability identifier from a second core network node, sending one or both of the first and second radio capability information to the second other apparatus.

According to a thirtieth aspect there is provided a non-transitory computer readable medium comprising program instructions for causing an apparatus to perform at least the following: receiving first radio capability information and second radio capability information of a user equipment from a first core network node, wherein the first radio capability information is formatted according to a first radio access technology and the second radio capability information is formatted according to a second radio access technology; causing an association to be made at the apparatus between a radio capability identifier and the first and second radio capability information of the user equipment; storing the association at the apparatus; and in response to receiving a request comprising the radio capability identifier from a second core network node, sending one or both of the first and second radio capability information to the second other apparatus.

According to a thirty first aspect there is provided a computer program comprising instructions for causing an apparatus to perform at least the following: receiving first radio capability information from a user equipment, the first radio capability information in a format of a first radio access technology; generating second radio capability information of the user equipment based on the first radio capability information, wherein the second radio capability information is generated in a format of a second radio access technology; and sending the first radio capability information and the second radio capability information to a core network node.

According to a thirty second aspect there is provided a non-transitory computer readable medium comprising program instructions for causing an apparatus to perform at least the following: receiving first radio capability information from a user equipment, the first radio capability information in a format of a first radio access technology; generating second radio capability information of the user equipment based on the first radio capability information, wherein the second radio capability information is generated in a format of a second radio access technology; and sending the first radio capability information and the second radio capability information to a core network node.

BRIEF DESCRIPTION OF FIGURES

The invention will now be described in further detail, by way of example only, with reference to the following examples and accompanying drawings, in which:

FIG. 7 shows the structure of an information element according to an example;

DETAILED DESCRIPTION

Before explaining in detail the examples, certain general principles of a wireless communication system are briefly explained with reference to FIG. 1 to assist in understanding the technology underlying the described examples.

Figure 1:
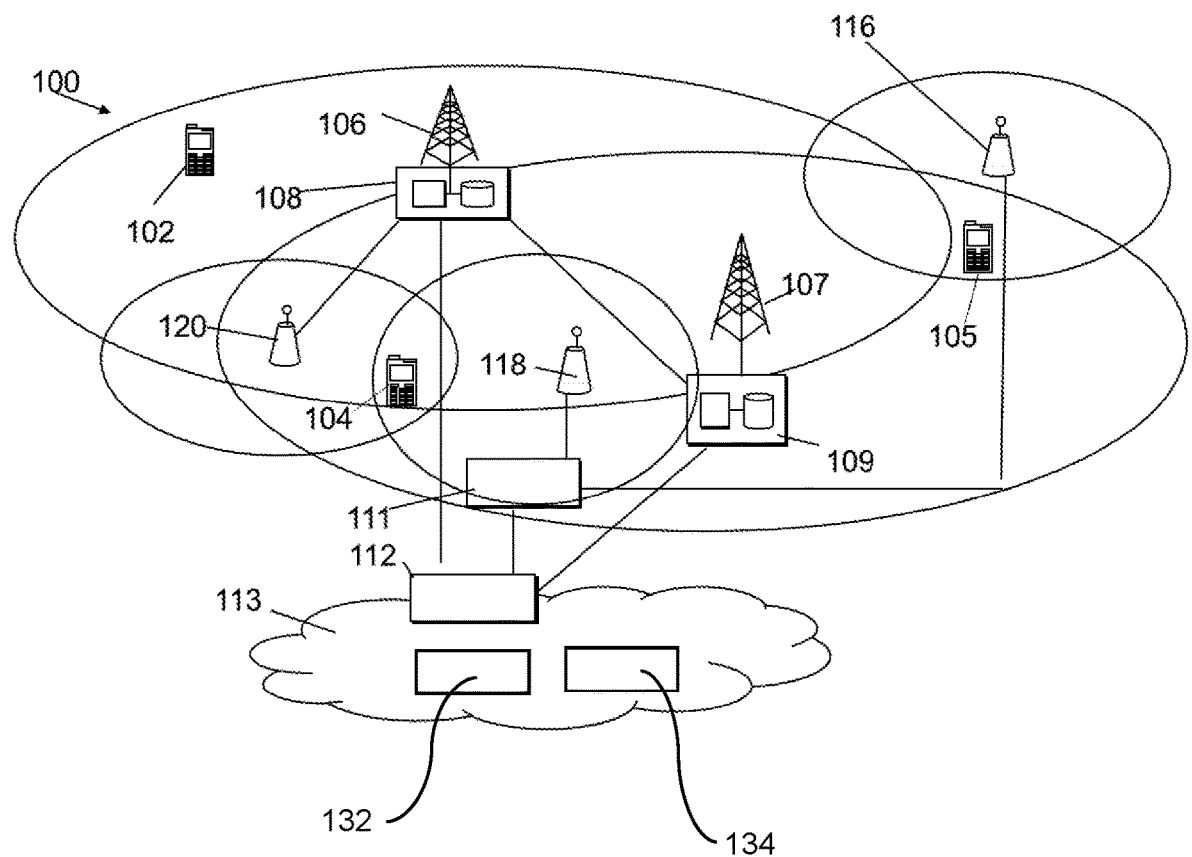
FIG. 1 shows a schematic example of a wireless communication system where the invention may be implemented.

In a wireless communication system 100, such as that shown in FIG. 1, a wireless communication devices, for example, user equipment (UE) or MTC devices 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (e.g. network 113) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wired communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

In some examples, the network 113 may be a core network (CN). CN may comprise, for example, a CN node schematically shown at 132. For example, CN node 132 may comprise an MME or an AMF.

As briefly described above, with the increase in the range of UE radio capabilities (for example driven by additional frequency bands and combinations thereof for E-UTRA and NR), it is beneficial for there to be an efficient approach for a UE to signal UE Radio Access Capability information over the radio interface and other network interfaces. Currently, the way that a UE signals its radio capabilities is defined with RAC (UE Radio Capability Signalling Optimization).

Figure 2A:
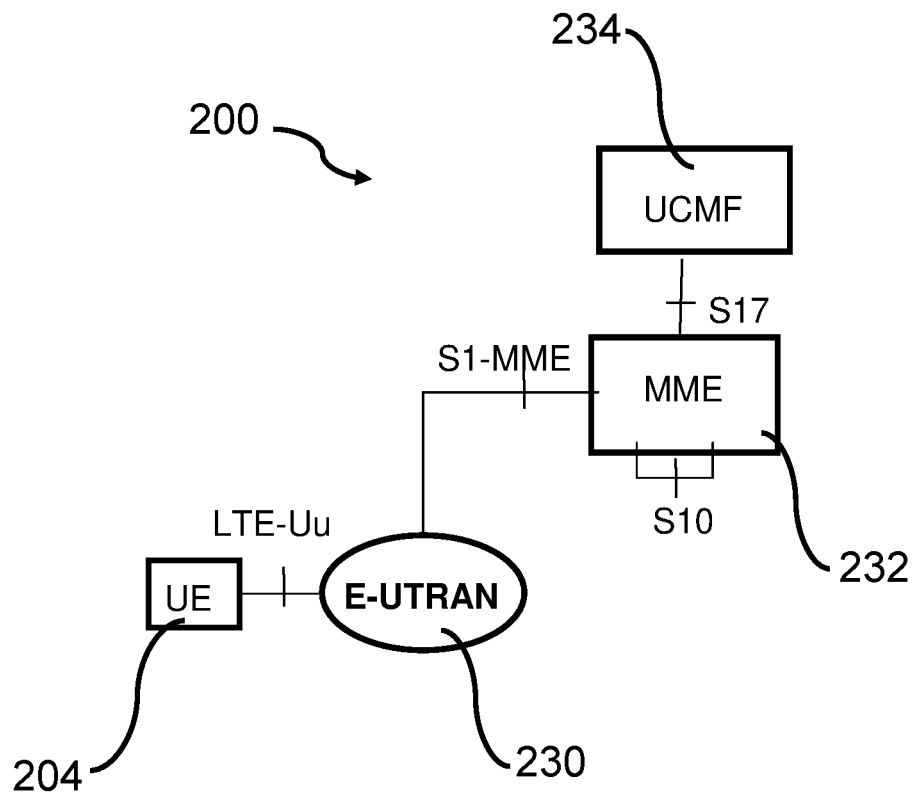
FIGS. 2A to 2C show RAC architecture according to some examples.

An example RAC architecture 200 for EPS (evolved packet system) is shown in FIG. 2A. The RAC 200 shows a UE 204 connected to E-UTRAN 230 over an LTE-Uu interface. A mobility management entity (MME) 232 is connected to E-UTRAN 230 over an S1-MME interface. A UE radio capability management function (UCMF) 234 is connected to MME 232 over an S17 interface.

RAC works by assigning an identifier to represent a set of UE radio capabilities. This identifier is called UE Radio Capability ID or RAC-ID. The UE Radio Capability ID is an alternative to the signalling of the radio capabilities container over one or more of: the radio interface; between the UE and the Core Network (CN); within the Radio Access Network (RAN) node (e.g. eNB, gNB, ng-eNB); from RAN to Core Network (CN) (e.g. MME, AMF (access management function)); from CN to RAN; and between CN nodes supporting RAC.

The UCMF 234 stores all UE Radio Capability ID mappings in a public land mobile network (PLMN). The UCMF 234 is responsible for assigning every PLMN-assigned UE Radio Capability ID in this PLMN.

In order to be able to interpret the UE Radio Capability ID, a network entity or node (e.g. eNB, gNB, ng-eNB, MME, or AMF) may store a local copy of the mapping between the UE Radio Capability ID and its corresponding UE Radio Access Capabilities information (which may also be referred to as UE Radio Capability IE (information element)). In some examples the UE Radio Access Capability IE is exchanged during a UE capability transfer procedure (see clause 5.6 of 3GPP TS 38.331). The local copy may be termed a "dictionary entry". When no mapping is available between a UE Radio Capability ID and the corresponding UE Radio Capability information in a network entity or node, this network entity or node shall be able to retrieve it and store it.

In some examples, a UE provides the UE Radio Capability ID (if the UE has one), to RAN/CN during the "attach" or "registration" procedure of the UE with the network. During a handover, the UE Radio Capability ID is transferred from the source RAN node to the target RAN node.

Figure 2B:
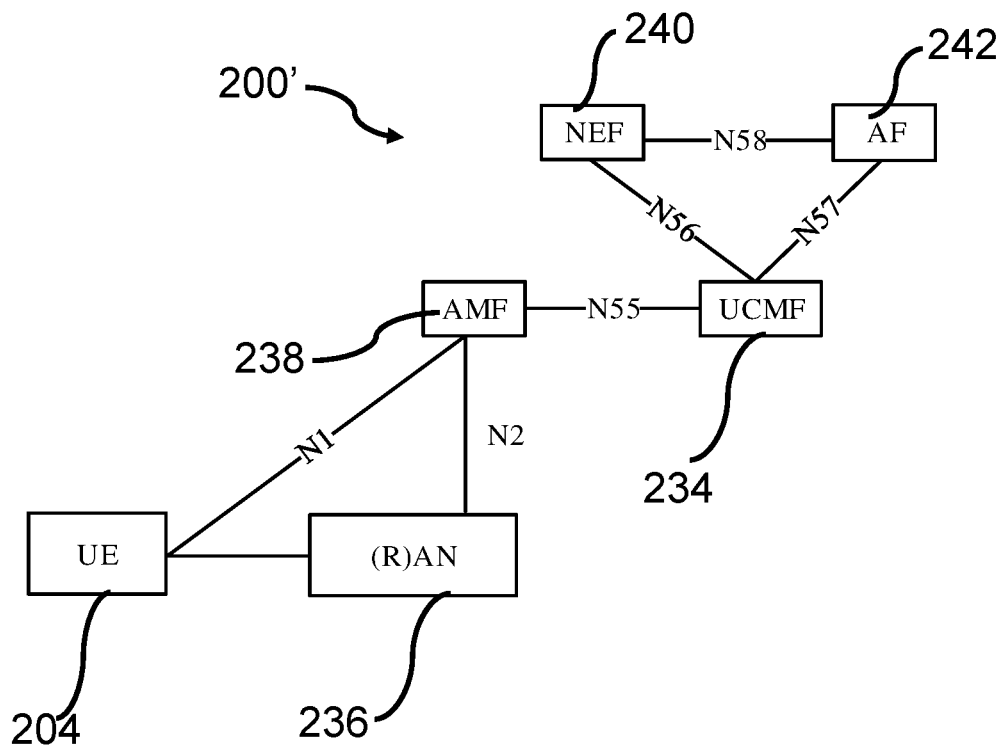

FIG. 2B shows an example of RAC architecture 200' for 5GC (5G core). In this example the UE 204 is connected to (R)AN 236. AMF 238 is connected to UE 204 over an N1 interface and AMF 238 is connected to (R)AN 236 over the N2 interface. AMF 238 is connected to UCMF 234 over the N55 interface. UCMF 234 is connected to network exposure function (NEF) 240 over the N56 interface, and UCMF 234 is connected to application function (AF) 242 over the N57 interface. The NEF 240 and the AF 242 are connected to each other over the N58 interface.

Figure 2C:
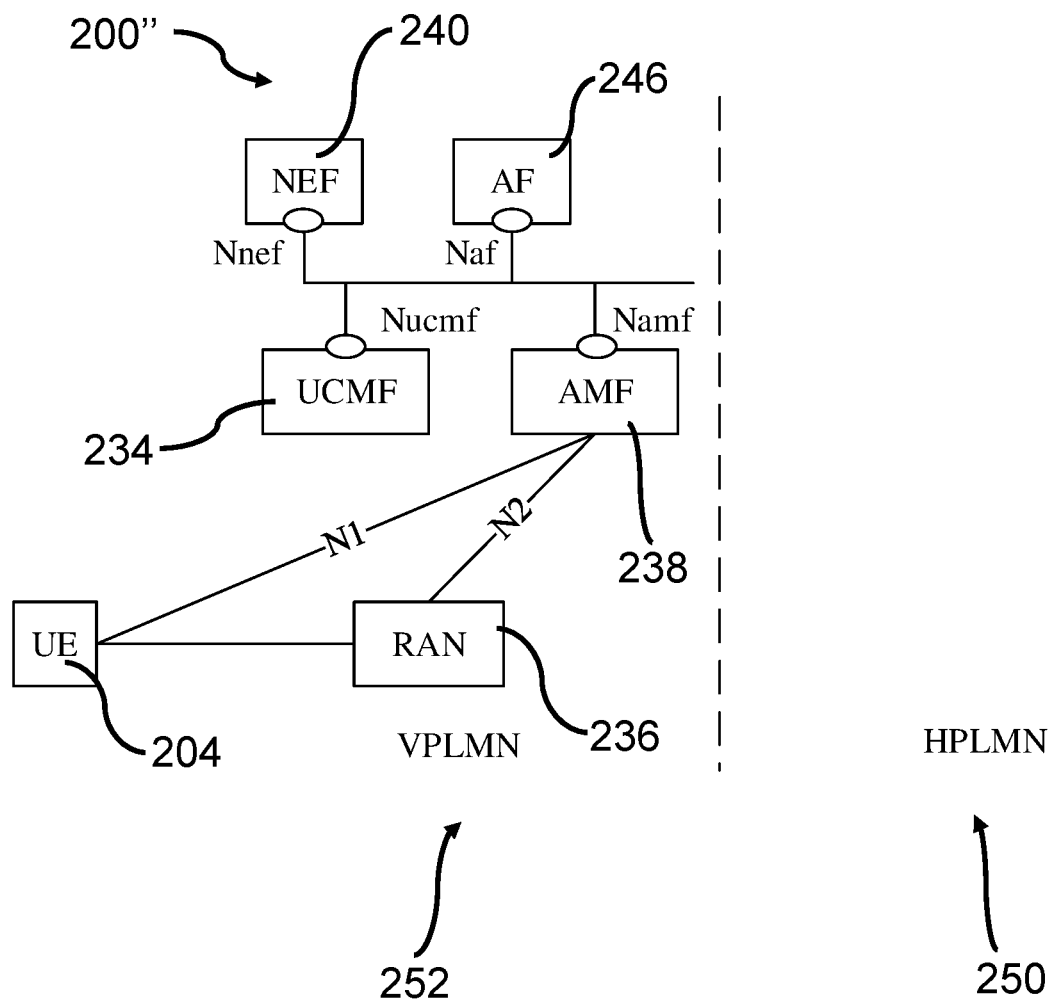

FIG. 2C shows an example of RAC architecture 200" for 5GC, in a roaming scenario. A Home PLMN is shown at 250, and a Visited PLMN is shown at 252. In the VPLMN 252, the UE is shown at 204 and the RAN is shown at 236. Both UE 204 and RAN 236 are connected to AMF 238 in the VPLMN 252. UCMF is shown at 234, NEF is shown at 240 and AF is shown at 246.

A discussion on different radio capability octet values across radio access technologies (RATs) has been discussed in 3GPP document S2-2000839 by Samsung (see the Discussion section at point 2 of S2-2000839). An observation made in S2-2000839 is that as the target RAN node has no idea of the coding style of the UE radio capability when received from the CN, it can lead to failure in procedure. In light of this, S2-2000839 proposed that whenever the UCMF is creating an entry in the database, it should also include the RAT type (E-UTRA or NG-RAN) in which the UE radio capabilities are encoded. Thus, when a RAC-ID is queried (from any node in the network) the combination of UE radio capabilities and RAT type (in which UE radio capability is encoded) is available, instead of only UE radio capabilities. It is the responsibility of the target RAN node to convert the UE radio capabilities in to the format it can understand before using it.

The present disclosure has identified some shortcomings with the proposal in S2-2000839. More particularly, the following issues have been identified:

The S2-2000839 proposal requires the target RAN node to decode the received Radio Capability IE according to source RAN node. This is counter to the principle that the source RAN node adapts to target RAN node during the inter-RAT HO. Currently, the source RAN node generates the Source to Target Transparent Container based on a target node's RAT type.

The S2-2000839 proposal requires a gNB to decode a 3GPP TS 36.331 formatted UE radio capability IE. The 3GPP TS 36.331 formatted UE radio capability is provided to the CN when the UE is first attached via an eNB. This does not work for a gNB which does not support the handover between 4G and 5G. Thus, such a gNB does not have the capability to decode a TS 36.331 formatted IE.

Similarly for an eNB, the eNB is required to decode a 3GPP TS 38.331 formatted UE radio capability IE. The TS 38.331 formatted UE radio capability is provided to the CN when the UE is first registered via a gNB. This does not work for an eNB which does not support the handover between 4G and 5G. Thus, such an eNB does not have the capability to decode a TS 38.331 formatted IE.

Figure 3:
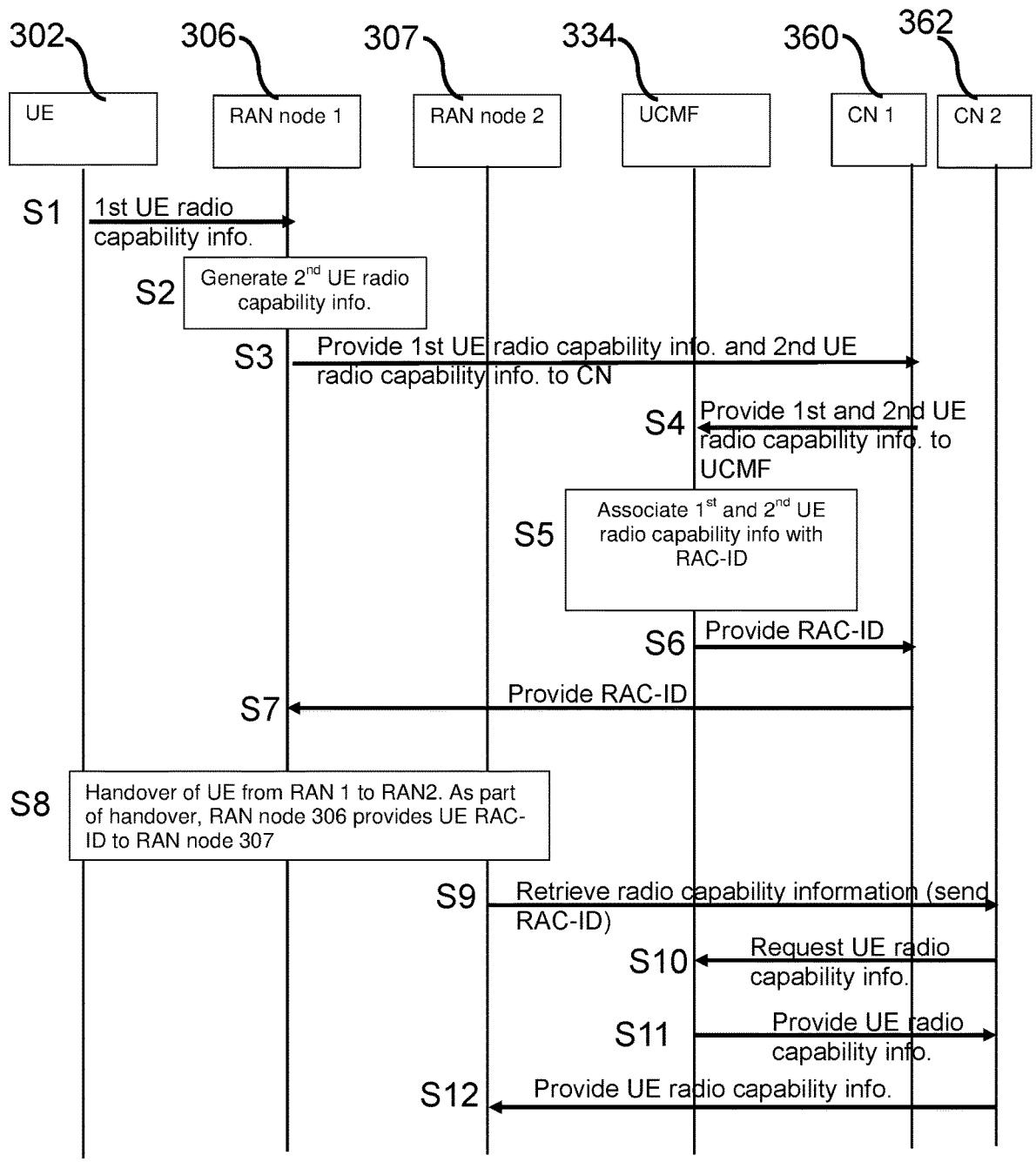
FIG. 3 shows a signalling diagram according to an example.

As will be discussed in more detail below, the present disclosure proposes a way to transfer and maintain the UE radio capability, while maintaining the "source adapt to target" principle. FIG. 3 provides an overview of the proposed process.

FIG. 3 is a signalling diagram showing signalling between a UE 302, first RAN node 306 or RAN node 1 306 (which in some examples may be a source RAN node), a second RAN node 307 or RAN node 2 307 (which in some examples may be a target RAN node), UCMF 334 and core network (CN) 360 and CN 362. CN 360 connects with the first RAN node 306, and CN 362 connects with the second RAN node 307. The first RAN node 306 operates according to a first RAT, and the second RAN node 307 operates according to a second RAT. The first RAT is different to the second RAT. For example, the first RAT is Evolved Universal Terrestrial Radio Access (E-UTRA) and the second RAT is NR Radio Access, or vice versa. The example of FIG. 3 is in the context of a handover, where UE 302 is being handed over from first RAN node 306 to second RAN node 307.

At S1, the UE 302 provides UE radio capability information to the first RAN node 306. In some examples, on the air interface the terminology "UE radio access capability information" may be used, while on other interfaces the terminology "UE radio capability information" may be used. In either case, it will be understood that it is referring to information pertaining to the radio capability of the user equipment. S1 may be as part of an attach or registration procedure, according to some examples. The radio capability information sent at S1 may be considered first radio capability information. The first UE radio capability information is encoded according to the first RAT. For example, when the first RAT is E-UTRA, the first radio capability information is encoded according to the E-UTRA air interface specification TS 36.331. Alternatively, the UE 302 provides both the first UE radio capability information encoded according to the first RAT and the second UE radio capability information encoded according to the second RAT. The UE 302 may also provide both the first UE radio capability information encoded according to the first RAT and the second UE radio capability information encoded according to the second RAT, per the request from the first RAN node 306, in some examples. For example, first radio capability information is encoded according to the E-UTRA air interface specification TS 36.331, and the second radio capability information is encoded according to the NR air interface specification TS 38.331.

Based on the UE capability information received at S1, at S2 the first RAN node 306 generates second UE radio capability information (for UE 302). The second UE radio capability information is encoded according to the second RAT (i.e. so that it can be understood/decoded by the second RAN node 307). For example, when the second RAT is NR access, the second radio capability information is encoded according to the NR air interface specification TS 38.331. Alternatively, when the UE 302 provides both the first UE radio capability information and the second UE radio capability information in S1, S2 is not performed.

At S3, the first RAN node 306 provides the first UE radio capability information and the second UE radio capability information to the Core Network 360.

Then, at S4, the Core Network 360 forwards the received first UE radio capability information and the second UE radio capability information to the UCMF 334.

At S5, the UCMF 334 associates the first UE radio capability information and the second UE radio capability information with a single UE Radio Capability ID (RAC-ID) for the UE 302. This association is stored at the UCMF 334.

At S6, the UCMF 334 provides the single UE Radio Capability ID (RAC-ID) to the Core Network 360. The Core Network 360 stores the association of this RAC-ID, and the first UE radio capability information and the second UE radio capability information.

At S7, the Core Network 360 provides the single UE Radio Capability ID (RAC-ID) to the first RAN node 306. The first RAN node 306 stores the association of this RAC-ID, and the first UE radio capability information and the second UE radio capability information. The first RAN node 306 uses the stored RAC-ID for further operation for the UE, for example, for a later handover. The Core Network 360 also provide the single UE Radio Capability ID (RAC-ID) to the UE 302 (not shown in the Figure).

As shown schematically at S8, there is handover of UE 302 from RAN node 1 306 to RAN node 2 307.

The handover may be X2/Xn-based handover, or S1/N2-based handover.

RAN node 1 306 provides the UE Radio Capability ID to RAN node 2 307 via the handover signalling, for example, a S1/N2 Handover Preparation procedure and Handover Resource Allocation.

At S9, the RAN node 2 307 does not have the mapping between the UE Radio Capability ID and the corresponding UE Radio Capability information.

The RAN node 2 307 initiates the retrieve procedure to retrieve the mapping from the core network. This procedure is performed over S1 interface when the core network is a MME. This procedure is performed over N2 interface when the core network is an AMF.

In another example, when the RAN node 2 307 has the mapping between the UE Radio Capability ID and the corresponding UE Radio Capability information, the following steps are not performed.

At S10, the CN 362 makes a request to the UCMF 334 for UE radio capability information of the UE Radio Capability ID. The request includes the UE Radio Capability ID (RAC-ID). This may be performed during core network node re-allocation and the new core network node does not have the mapping between a UE Radio Capability ID and the corresponding UE Radio Capability information. The core network re-allocation can happen, for example for any one or more of: when the UE moves out of the service area of current core network and moves in to the service area of the new core network; when the UE is handover from the first RAN node to the second RAN node; when the UE is IDLE and connects to the second RAN node.

In another example, when the CN 362 has the mapping between the UE Radio Capability ID and the corresponding UE Radio Capability information, S10 and S11 are not performed.

In response, at S11 the UCMF 334 provides the UE radio capability information of the UE radio capability ID to the CN 362. The CN 362 stores the UE Radio Capability ID, and associates the UE Radio Capability ID with the first and second UE radio capability information.

In some examples, a manner the UCMF 334 provides the UE radio capability information to the CN 362 is dependent on one or more circumstances. In one example, the one or more circumstances comprises which entity in the CN has requested the UE radio capability information at S10. For example, if the UE radio capability information is requested by an AMF (Access and Mobility Management Function) in the CN 362 and the RAN (controlled by the AMF) contains at least one gNB and at least one ng-eNB (an eNB working under E-UTRA-NR Dual Connectivity, or NR-E-UTRA Dual Connectivity), then the UCMF 334 provides both the first UE radio capability information and the second UE radio capability information to the CN 362 (e.g. to the AMF). In another example, where the request at S10 originates from an MME and the RAN nodes contains one or more eNBs and at least one en-gNB (a gNB working under E-UTRA-NR Dual Connectivity), then the UCMF 334 provides both the first and second UE radio capability information to the MME in the CN 362. In another example, where the request at S10 originates from an AMF and the RAN only contains one or more gNBs, then the UCMF 334 only provides one of the first and second UE radio capability information to the AMF in the CN 362. For example, the UCMF 334 only provides the UE radio capability information encoded according to the NR air interface specification TS 38.331. In another example, where the request at S10 originates from an MME and the RAN only contains one or more eNBs, then the UCMF 334 only provides one of the first and second UE radio capability information to the MME in the CN 362. For example, the UCMF 334 only provides the UE radio capability information encoded according to the E-UTRA air interface specification TS 36.331. In another example, the UCMF 334 may always provide both the first and second UE radio capability information to the AMF or MME in the CN 362. This may be up to the configuration and implementation in the UCMF 334.

In some examples, the UCMF 334 may be configured to perform the adjustment according to the RAT type of RAN node 2. When the UCMF 334 provides both the first and second UE radio capability information to the AMF or MME in the CN 362, the UCMF may adjust the order of the UE radio capability information to align with the RAT type of the RAN node 2. For example, in UCMF 334, the stored first UE radio capability information is encoded according to TS 36.331 and the second UE radio capability information is encoded according to TS 38.331. In some examples, when the second RAN node 307 is a gNB, the UCMF 334 copies the content of the stored second UE radio capability information to the first UE radio capability information in the message sent to the AMF in S11. The UCMF 334 copies the content of the stored first UE radio capability information to the second UE radio capability information in the message sent to the AMF in S11.

In another example, in UCMF 334, the stored first UE radio capability information is encoded according to TS 38.331 and the second UE radio capability information is encoded according to TS 36.331. When the second RAN node 307 is an eNB or ng-eNB, the UCMF 334 copies the content of the stored second UE radio capability information to the first UE radio capability information in the message sent to the MME in S11. The UCMF 334 copies the content of the stored first UE radio capability information to the second UE radio capability information in the message sent to the MME in S11.

At S12, the CN 362 provides the UE radio capability information of the UE radio capability ID to the second RAN node 307. The second RAN node 307 stores the UE Radio Capability ID, and associates the UE Radio Capability ID with the first and second UE radio capability information.

In some examples, a manner the CN 362 provides the UE radio capability information to the RAN node 307 is dependent on one or more circumstances.

In one example, the one or more circumstances comprises which entity in the RAN has requested the UE radio capability information at S9. For example, the CN 362 only provides one of the first UE radio capability information and the second UE radio capability information to the RAN node 2 307, based on the RAT type of RAN node 2. For example, if the RAN node 2 is a gNB, the CN 362 only provides the radio capability information encoded according to NR access air interface specification TS38.331. In another example, the CN 362 may provide both the first UE radio capability information and the second UE radio capability information to the RAN node 2 307. For example, the RAN node 2 307 may start the dual connectivity later involving another RAN node with different RAT type. The RAN node 2 307 may act as a Master Node and add another RAN node of a different RAT type as a Secondary Node. In another example, the CN 362 may always provide both the first UE radio capability information and the second UE radio capability information to the RAN node 2 307. This may be up to the configuration and implementation in the RAN node 2 307.

In some examples, the CN 362 may be configured to perform the adjustment according to the RAT type of RAN node 2, for example, when the UCMF 334 does not perform the adjustment. When the CN 362 provides both the first and second UE radio capability information to the RAN node 2 307, the CN 362 may adjust the order of the UE radio capability information to align with the RAT type of the RAN node 2 307. For example, in CN 362, the stored or received first UE radio capability information is encoded according to TS 36.331 and the second UE radio capability information is encoded according to TS 38.331. When the RAN node 2 307 is a gNB, the CN 362 copies the content of the stored second UE radio capability information to the first UE radio capability information in the message sent to the RAN node 2 307 in S12. The CN 362 copies the content of the stored first UE radio capability information to the second UE radio capability information in the message sent to the RAN node 2 307 in S12.

In another example, in CN 362, the stored first UE radio capability information is encoded according to TS 38.331 and the second UE radio capability information is encoded according to TS 36.331. When the RAN node 2 307 is an eNB or ng-eNB, the CN 362 copies the content of the stored second UE radio capability information to the first UE radio capability information in the message sent to the RAN node 2 307 in S12. The CN 362 copies the content of the stored first UE radio capability information to the second UE radio capability information in the message sent to the RAN node 2 307 in S12.

Figure 4:
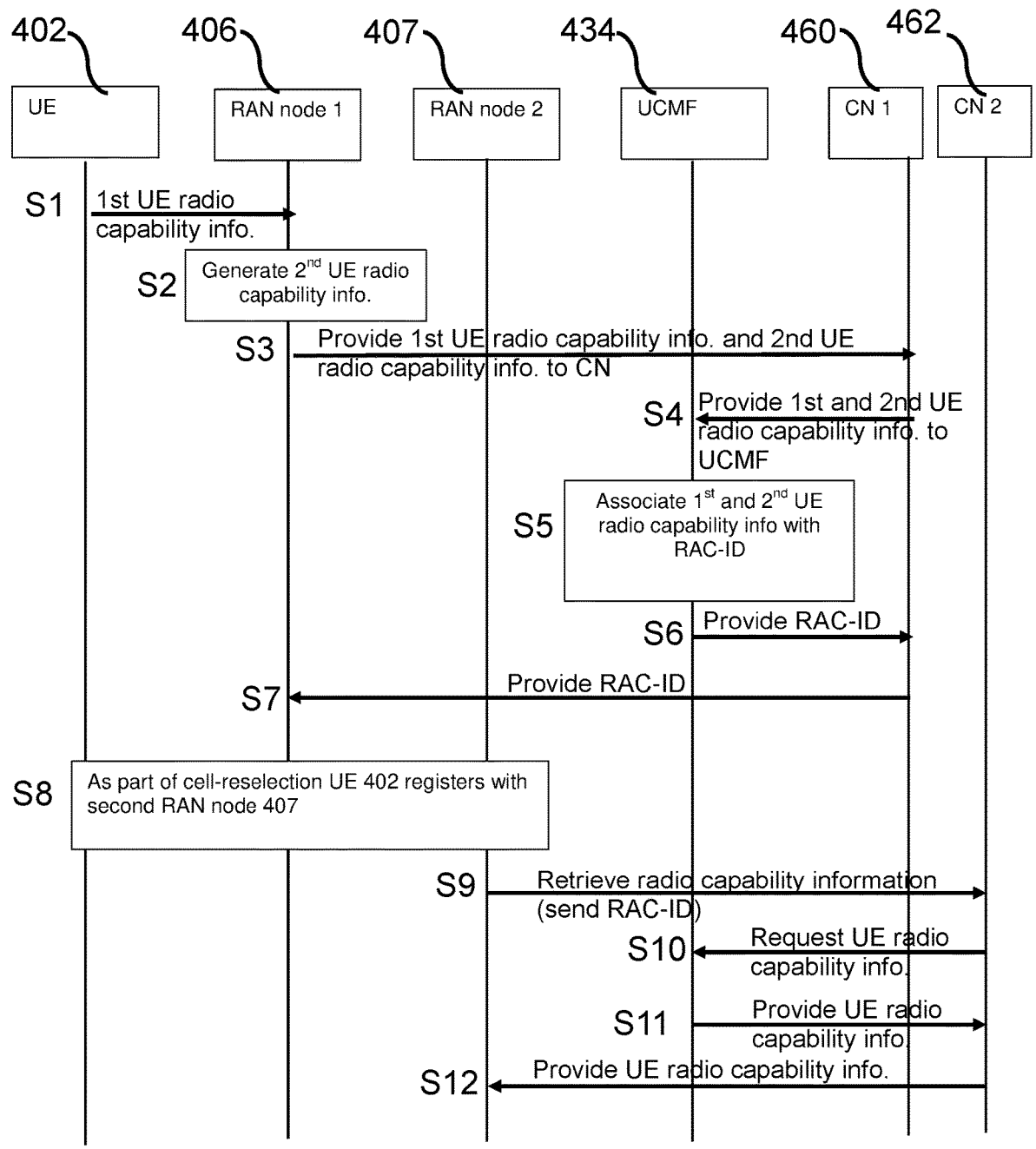
FIG. 4 shows a signalling diagram according to an example.

The method of FIG. 3 relates to an inter-RAT handover (HO) situation. An alternative example is now described with respect to FIG. 4, which relates to inter-RAT reselection (i.e. cell reselection). In the example of FIG. 4, RAN node 1 406 may be for example an LTE eNB and RAN node 2 407 may be for example a NR gNB (or vice versa). S1 to S7 and S9 to S12 are the same as FIG. 3, so for conciseness are not repeated.

In FIG. 4, at S8 the UE 402, as part of cell-reselection, registers with second RAN node 407. As part of the registration or attach procedure, the UE 402 provides the UE Radio Capability ID to the core network CN 2 462, and CN 2 462 provide the UE radio capability ID to the RAN node 2 407.

Figure 5:
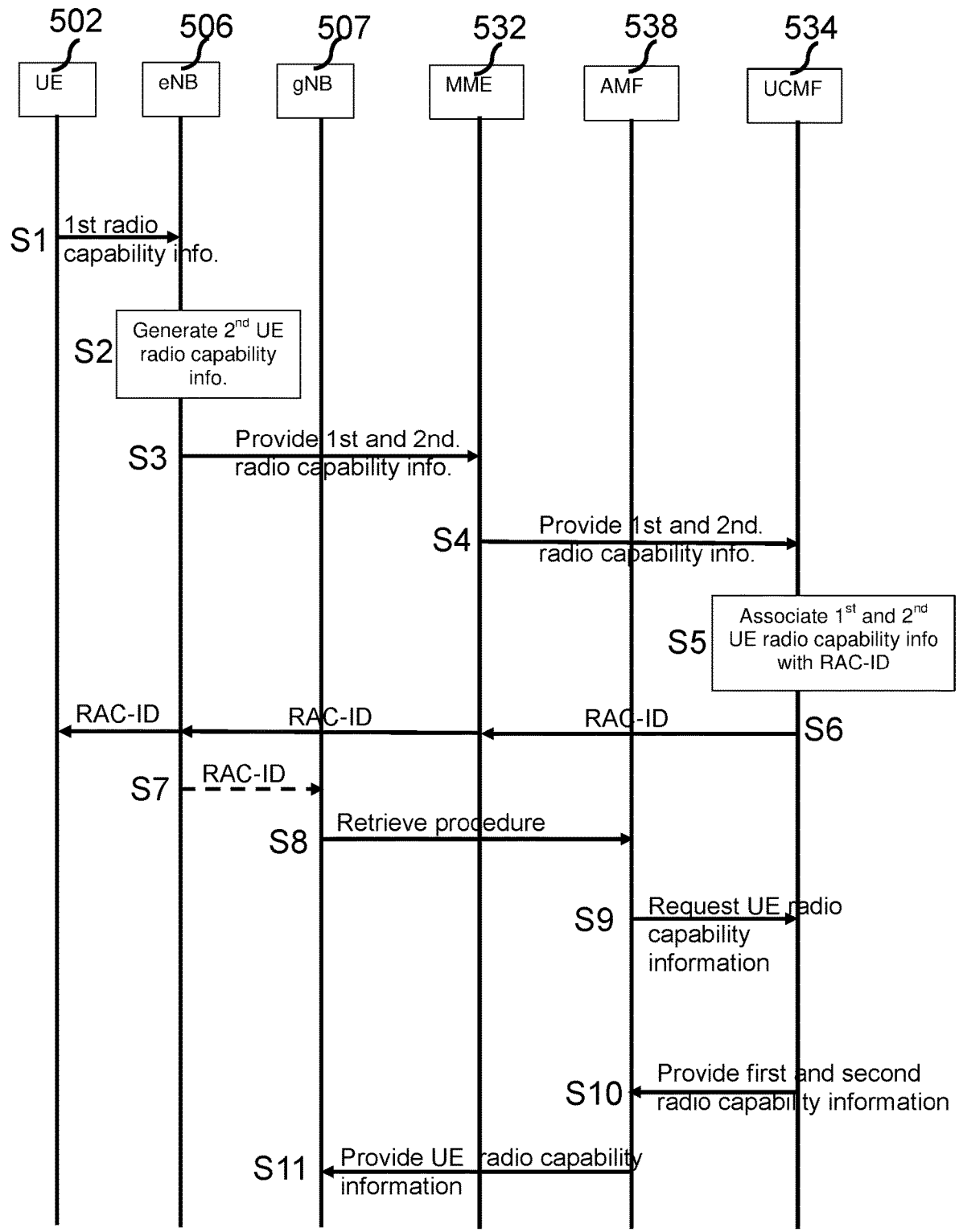
FIG. 5 shows a signalling diagram according to an example.

An example will now be described in more detail with respect to FIG. 5. It will be noted that this example maintains the current "source adapt to target" principle. The entities shown in FIG. 5 are UE 502, eNB 506, gNB 507, MME 532, AMF 538, and UCMF 534. The example of FIG. 5 is in the context of a handover from the eNB 506/MME 532 (source) to gNB 507/AMF 538 (target).

At S1, the UE 502 provides UE radio capability information to eNB 506. The UE radio capability information provided at S1 is provided in TS 36.331 format. For the purpose of explanation, the UE radio capability information provided at S1 may be considered the first UE radio capability information. Alternatively, the UE 502 provides both the first UE radio capability information encoded according to the TS 36.331 and the second UE radio capability information encoded according to the TS 38.331 (or vice versa). The UE 502 may also provide both the first UE radio capability information and the second UE radio capability information, per the request from the eNB 506. For example, a TS 36.331 RRC container carrying the second UE radio capability information encoded in TS 38.331 format.

At S2, the eNB 506 generates the second UE radio capability information, based on the received first UE radio capability information. The second UE radio capability information is encoded in TS 38.331 format when the eNB 506 only received the first capability information encoded according to the TS 36.331 in S1. Alternatively, when the UE 502 provides both the first UE radio capability information and the second UE radio capability information in S1, S2 is not performed.

At S3, the eNB 506 provides the $1^{st}$ radio capability information and the $2^{nd}$ radio capability information to the MME 532. In an example, the eNB 506 provides the first and second UE radio capability information to the MME 532 via S1AP UE Capability Info Indication procedure. In examples, the S1AP UE CAPABILITY INFO INDICATION message is enhanced to include the second UE radio capability information (e.g. the second UE radio capability IE).

At S4, the MME provides the first UE radio capability information and the second UE radio capability information to the UCMF 534. In some examples, the MME provides the first UE radio capability information and the second UE radio capability information to the UCMF 534 via an S17 reference point, for example, the Create Dictionary Entry procedure. In examples, the Create Dictionary Entry Request message is enhanced to include the second UE radio capability information element. In examples, the UCMF 534 knows that the peer node is an MME (in this case MME 532). In some examples this is because the UCMF 534 stores peer node information (e.g. MME rather than AMF), through implementation. Therefore the UCMF 534 knows that the first UE radio capability information is encoded in TS 36.331 format, and that the second UE radio capability information is encoded in TS 38.331 format.

As shown at S5, the UCMF 534 then stores the first UE radio capability information and the second UE radio capability information, and stores and associates them with one single RAC-ID. In one example, the UCMF 534 stores information that the first UE radio capability information is in TS 36.331 format and the second UE radio capability information is in TS 38.331 format.

At S6, the UCMF 534 replies to the MME 532 with the RAC-ID (i.e. the RAC-ID stored in association with the first and second UE radio capability information). The RAC-ID may also be passed on from MME 532 to eNB 506, and from MME 532 to UE 502 via eNB 506, as shown. The MME 532 and the eNB 506 stores the UE Radio Capability ID (RAC-ID), and associates the UE Radio Capability ID with the first and second UE radio capability information.

At S7, when the UE 502 is handed over to gNB 507, the eNB 506 (i.e. source RAN node) provides the UE radio capability ID to target gNB 507 in the handover signaling, for example, by including the RAC-ID in the Source to Target Transparent Container. In FIG. 5, for conciseness it is shown that the RAC-ID is sent from eNB 506 to gNB 507 at S7. This is schematically shown by the dashed arrow. It will be understood that in practical examples the RAC-ID is transmitted from eNB 506 to MME 532 to AMF 538 to gNB 507. In other words it may be considered that the Source to Target Transparent Container is transmitted from eNB 506 to gNB 507, via MME 532 and AMF 538.

At S8, upon reception of the RAC-ID at the gNB 507, and when the gNB 507 does not have cached radio capability information for the received RAC-ID, the gNB 507 initiates a UE radio capability retrieve procedure and provides the RAC-ID.

At S9, the AMF 538 initiates a procedure to retrieve or request the UE radio capability information from the UCMF 534. For example, the AMF 538 initiates a Nucmf_UECapabilityManagement Resolve service operation for the RAC ID received in S8.

In examples, S9 includes sending a UE radio capability request to UCMF 534. Knowing that the request has initiated from an AMF, the UCMF 534 replies to the AMF 538 with the first UE radio capability information and the second UE radio capability information. This is shown at S10. It is noted that the UCMF 534 may provide both the first and second UE radio capability information when the UCMF 534 does not know whether the NG-RAN node is a gNB or an ng-eNB. In examples, the UCMF 534 copies the stored second UE Radio Capability Info to the ueRadioCapability (TS38.331 format) attribute of DicEntryData. In examples, the UCMF 534 also copies the stored first UE Radio Capability Info to the 2ndueRadioCapability (TS36.331 format) attribute of DicEntryData. In one example, the UCMF 534 may only provide one of the first and second UE radio capability information to the AMF 538, for example, when the UCMF 534 knows the type of RAN nodes connected to AMF 538. In another example, the UCMF 534 may always provide both the first and second UE radio capability information to the AMF 538. This may be up to the configuration and implementation in the UCMF 534.

In this example, the AMF 538 knows that the peer RAN node is gNB.

Therefore, in this example, the AMF 538 may only forward one of the first UE radio capability information and the second UE radio capability information to the gNB 507. For example, the UE radio capability information forwarded to gNB 507 is TS38.331 formatted. This is shown at S11. In another example, when the peer RAN node is ng-eNB, the AMF 538 only forwards the (TS36.331 formatted) UE radio capability information to the ng-eNB. In one example, the AMF 538 may only provide one of the first and second UE radio capability information to the RAN node 507, for example, when the AMF 538 knows the type of RAN nodes connected to AMF 538. In another example, the AMF 538 may always forward both the first UE radio capability information and the second UE radio capability information to the RAN node 507. This may be up to the configuration and implementation in the AMF 538.

Figure 6:
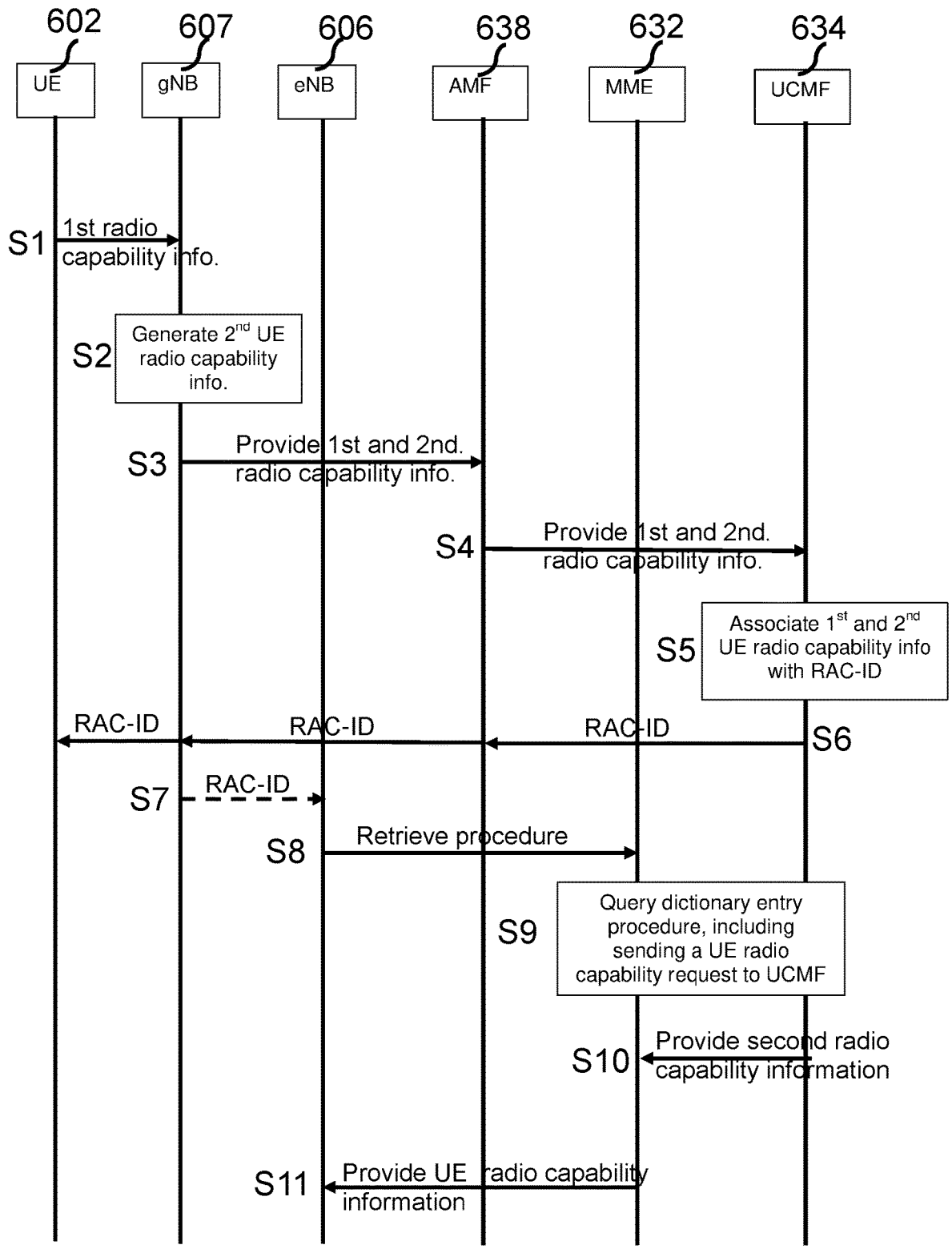
FIG. 6 shows a signalling diagram according to an example.

A further example will now be described in more detail with respect to FIG. 6. The entities shown in FIG. 6 are UE 602, eNB 606, gNB 607, MME 632, AMF 638, and UCMF 634. The example of FIG. 6 is in the context of a handover from the gNB 607/AMF 638 (source) to eNB 606/MME 632 (target).

At S1, the UE 602 sends first UE radio capability information from UE 602 to gNB 607. The first UE radio capability information provided at S2 is provided in TS 38.331 format. Alternatively, the UE 602 provides both the first UE radio capability information encoded according to the TS 38.331 and the second UE radio capability information encoded according to the TS 36.331 (or vice versa). The UE 602 may also provide both the first UE radio capability information and the second UE radio capability information, per the request from the gNB 607. For example, a TS 38.331 RRC container carrying the second UE radio capability information encoded in TS 36.331 format.

At S2, the gNB 607 generates second UE radio capability information, based on the received first UE radio capability information. The second UE radio capability information is encoded in TS 36.331 format when the gNB 607 only received the first capability information encoded according to the TS 38.331 in S1. Alternatively, when the UE 602 provides both the first UE radio capability information and the second UE radio capability information in S1, S2 is not performed.

At S3, the gNB 607 provides the first radio capability information and the second radio capability information to the AMF 638. In an example, the gNB 607 provides the first and second UE radio capability information to the AMF 638 via NGAP UE Radio Capability Info Indication procedure. In examples, the NGAP UE RADIO CAPABILITY INFO INDICATION message is enhanced to include the second UE radio capability information (e.g. the second UE radio capability IE).

At S4, the AMF 638 provides the first UE radio capability information and the second UE radio capability information to the UCMF 634. In some examples, the AMF 638 provides the first UE radio capability information and the second UE radio capability information to the UCMF 634 via an N55 reference point, for example, the Nucmf_UECapabilityManagement_Assign service operation. In examples, the Nucmf_UECapabilityManagement_Assign service operation is enhanced to include the second UE radio capability information element. In examples, the UCMF 634 knows that the peer node is an AMF (in this case AMF 638). In some examples this is because the UCMF 634 stores peer node information (e.g. AMF rather than MME), through implementation. Therefore the UCMF 634 knows that the first UE radio capability information is encoded in TS 38.331 format, and that the second UE radio capability information is encoded in TS 36.331 format. Alternatively, it may be defined that the same format is used in both S17 reference point (between MME and UCMF) and N55 reference point (between AMF and UCMF). For example, the first UE radio capability information is encoded in TS 38.331 format, and that the second UE radio capability information is encoded in TS 36.331 format, or vice versa.

As shown at S5, the UCMF 634 then stores the first UE radio capability information and the second UE radio capability information, and stores and associates them with one single RAC-ID. In one example, the UCMF 634 stores information that the first UE radio capability information is in TS 38.331 format and the second UE radio capability information is in TS 36.331 format.

At S6, the UCMF 634 replies to the AMF 638 with the RAC-ID (i.e. the RAC-ID stored in association with the first and second UE radio capability information). The RAC-ID may also be passed on from AMF 638 to gNB 607, and from AMF 638 to UE 602 via gNB 607, as shown. The AMF 638 and the gNB 607 store the UE Radio Capability ID (RAC-ID), and associate the UE Radio Capability ID with the first and second UE radio capability information.

At S7, when the UE 602 is handed over to eNB 606, the gNB 607 (i.e. source RAN node) provides the UE radio capability ID to target gNB 606 in the handover signaling, for example, by including the RAC-ID in the Source to Target Transparent Container. In FIG. 6, for conciseness it is shown that the RAC-ID is sent from gNB 607 to eNB 606 at S7. This is schematically shown by the dashed arrow. It will be understood that in practical examples the RAC-ID is transmitted from gNB 607 to AMF 638 to MME 632 to eNB 606. In other words it may be considered that the Source to Target Transparent Container is transmitted from gNB 607 to eNB 606, via AMF 638 and MME 632.

At S8, upon reception of the RAC-ID at the eNB 606, and when the eNB 606 does not have cached radio capability information of UE 602, the eNB 606 initiates a UE radio capability retrieve procedure and provides the RAC-ID to MME 632.

At S9, the MME 632 initiates a procedure to retrieve the UE radio capability information from the UCMF 634. For example, the MME 632 initiates a Query Dictionary Entry procedure for the RAC ID received in S8.

In examples, the Query Dictionary Entry procedure comprises the MME 632 sending a request for UE radio capability information of a UE radio capability ID to UCMF 634, as shown at S9.

In this example, knowing that the request at S9 has initiated from an MME, the UCMF 634 replies to the MME 632 with only the second UE radio capability information (i.e. TS36.331 format). This is shown at S10. In another example, the UCMF 634 may always provide both the first and second UE radio capability information to the MME 632. This may be up to the configuration and implementation in the UCMF 634.

As shown at S11, the MME 632 may only forward one of the first UE radio capability information and the second UE radio capability information to the eNB 606. For example, the UE radio capability information forwarded to the eNB 606 is TS 36.331 formatted. In another example, the MME 632 may always forward both the first UE radio capability information and the second UE radio capability information to the RAN node 606. This may be up to the configuration and implementation in the MME 632.

There now follows a description of some changes to messages and information elements.

Table 1 below shows an example for adding the second UE radio capability information in the S1AP UE CAPABILITY INFO INDICATION message. This indication is sent by the eNB to the MME to provide the first and the second UE radio capability information to the MME (see for example S3 in FIG. 5).

TABLE 1

| IE/Group Name | Presence | IE type and Range reference | Semantics description | Criticality | Assigned Criticality |
|---|---|---|---|---|---|
| Message Type | M | 9.2.1.1 | | YES | ignore |
| MME UE S1AP ID | M | 9.2.3.3 | | YES | reject |
| eNB UE S1AP ID | M | 9.2.3.4 | | YES | reject |
| UE Radio Capability | M | 9.2.1.27 | | YES | ignore |
| UE Radio Capability for Paging | O | 9.2.1.98 | | YES | ignore |
| UE Application Layer Measurement Capability | O | BIT STRING (SIZE(8)) | Each bit in the bitmap indicates an UE Application layer measurement capability, refer to TS 25.331[10]. Bit 0 = QoE Measurement for streaming service Bit 1 = QoE Measurement for MTSI service Value '1' indicates "Capable" and value '0' indicates "not Capable". Unused bits are reserved for future use. | YES | ignore |

TABLE 1-continued

| IE/Group Name | Presence | IE type and Range reference | Semantics description | Criticality | Assigned Criticality |
|---|---|---|---|---|---|
| LTE-M Indication | O | 9.2.1.135 | | YES | ignore |
| 2$^{nd}$ UE Radio Capability | O | 9.2.1.xx | | YES | ignore |

Of note in Table 1 is the presence of the second UE radio capability IE (last row).

Table 2 below shows the content of the second UE radio capability IE.

TABLE 2

| IE/Group Name | Presence | Range | IE Type and Reference | Semantics Description |
|---|---|---|---|---|
| 2$^{nd}$ UE Radio Capability | M | | OCTET STRING | Includes the UERadioAccessCapabilityInformation message as defined in TS 38.331 [x]. |

As shown in Table 2, the second UE radio capability IE is an octet string and comprises the UERadioAccessCapabilityInformation message as defined in TS 38.331.

Table 3 shows the content of the S1AP INITIAL CONTEXT SETUP REQUEST message. This message is sent by the MME to the eNB, to request the setup of a UE context. Similar changes are also applicable to the NGAP INITIAL CONTEXT SETUP REQUEST message.

TABLE 3

| IE/Group Name | Presence | IE type and Range reference | Semantics description | Criticality | Assigned Criticality |
|---|---|---|---|---|---|
| Message Type | M | 9.2.1.1 | | YES | reject |
| MME UE S1AP ID | M | 9.2.3.3 | | YES | reject |
| eNB UE S1AP ID | M | 9.2.3.4 | | YES | reject |
| ... | | | | | |
| UE Radio Capability | O | 9.3.1.27 | | YES | ignore |
| ... | | | | | |
| 2$^{nd}$ UE Radio Capability | O | 9.2.1.xx | | YES | ignore |

Of note in Table 3 is the presence of the second UE radio capability information IE.

Table 4 shows the content of the NGAP UE RADIO CAPABILITY INFO INDICATION message. This message is sent by the NG-RAN node to the AMF to provide UE the first and the second radio capability related information to the AMF (see for example S4 in FIG. 6).

TABLE 4

| IE/Group Name | Presence | IE type and Range reference | Semantics description | Criticality | Assigned Criticality |
|---|---|---|---|---|---|
| Message Type | M | 9.3.1.1 | | YES | ignore |
| AMF UE NGAP ID | M | 9.3.3.1 | | YES | reject |
| RAN UE NGAP ID | M | 9.3.3.2 | | YES | reject |
| UE Radio Capability | M | 9.3.1.74 | | YES | ignore |
| UE Radio Capability for Paging | O | 9.3.1.68 | | YES | ignore |
| 2$^{nd}$ UE Radio Capability | O | 9.3.1.xx | | YES | ignore |

Of note in Table 4 is the presence of the second UE radio capability information IE (last row).

Table 5 shows the content of a NGAP UE RADIO CAPABILITY CHECK REQUEST message. This message is sent by the AMF to the NG-RAN node, to check the compatibility between the UE radio capabilities and network configuration on IMS voice.

TABLE 5

| IE/Group Name | Presence | IE type and Range reference | Semantics description | Criticality | Assigned Criticality |
|---|---|---|---|---|---|
| Message Type | M | 9.3.1.1 | | YES | reject |
| AMF UE NGAP ID | M | 9.3.3.1 | | YES | reject |
| RAN UE NGAP ID | M | 9.3.3.2 | | YES | reject |
| UE Radio Capability | O | 9.3.1.74 | | YES | ignore |
| 2$^{nd}$ UE Radio Capability | O | 9.3.1.xx | | YES | ignore |

Of note in Table 5 is the presence of the second UE radio capability information IE (last row).

It is proposed to add the new second UE radio capability IE in the NGAP procedure, for example, the NGAP UE capability ID mapping response. In examples, this message is sent by the AMF to provide the first and the second UE Radio Capability information which is associated to the UE Radio Capability ID indicated by the NG-RAN node in the UE CAPABILITY ID MAPPING REQUEST message. This message is sent from the AMF to the NG-RAN node. This message is shown in Table 6 below.

TABLE 6

| IE/Group Name | Presence | IE type and Range reference | Semantics description | Criticality | Assigned Criticality |
|---|---|---|---|---|---|
| Message Type | M | 9.3.1.1 | | YES | reject |
| UE Radio Capability | M | 9.3.1.74 | | YES | ignore |
| 2$^{nd}$ UE Radio Capability | O | 9.3.1.xx | | YES | ignore |
| Criticality Diagnostics | O | 9.3.1.3 | | YES | ignore |

The second UE radio capability IE referred to in Table 6 above is shown in more detail below in Table 7.

TABLE 7

| IE/Group Name | Presence | Range | IE Type and Reference | Semantics Description |
|---|---|---|---|---|
| 2$^{nd}$ UE Radio Capability | M | | OCTET STRING | Includes the UERadioAccessCapabilityInformation message as defined in TS 36.331 [21]. |

It is noted that the second UE radio capability IE of Table 7 comprises an octet string and comprises the UERadioAccessCapabilityInformation message as defined in TS 36.331.

Similar change is also applicable to the S1AP procedure, for example, the S1AP UE capability ID mapping response. The MME initiates the procedure to provide the first and the second UE Radio Capability information associated to the UE Radio Capability ID indicated by the eNB, for example, in the UE CAPABILITY ID MAPPING REQUEST message, to the eNB.

There now follows a description of proposed changes to the S17 interface (MME-UCMF) message and IEs of TS 29.674.

Create Dictionary Entry Request—The Create Dictionary Entry Request is sent over the S17 interface by the MME to create a dictionary entry in the UCMF, and then to obtain a PLMN assigned UE Radio Capability ID. IEs of the Create Dictionary Entry Request are shown in Table 8 below. The message is enhanced to add the second UE radio capability information.

TABLE 8

| Information elements | P | Condition/Comment | IE Type |
|---|---|---|---|
| Type Allocation Code | M | This IE shall be included by the MME over S17 reference point. | Type Allocation Code |

TABLE 8-continued

| Information elements | P | Condition/Comment | IE Type |
|---|---|---|---|
| Software Version Number | C | This IE shall be included if available by the MME over S17 reference point. | Software Version Number |
| UE Radio Access Capability Information | M | | UE Radio Access Capability Information |
| 2$^{nd}$ UE Radio Access Capability Information | O | | 2$^{nd}$ UE Radio Access Capability Information |

Of note in Table 8 is the presence of the second UE radio capability IE.

Query Dictionary Entry Response—The Query Dictionary Entry Response is sent over the S17 interface by the UCMF to the MME as a reply to the Query Dictionary Entry Request. The message is enhanced to add the second UE radio capability information.

TABLE 9

| Information elements | P | Condition/Comment | IE Type |
|---|---|---|---|
| Cause | M | | Cause |
| Dictionary Entry ID | C | This IE shall be included to contain a dictionary entry identifier if the Cause indicates an acceptance cause. | Dictionary Entry ID |
| PLMN Assigned UE Radio Capability ID | C | This IE shall be included to contain a PLMN Assigned UE Radio Capability ID if allocated for the UE Radio Access Capability Information in the dictionary entry and if the Cause indicates an acceptance cause. | PLMN Assigned UE Radio Capability ID |
| Manufacturer Assigned UE Radio Capability ID | C | This IE shall be included to contain a Manufacturer Assigned UE Radio Capability ID if available for the UE Radio Access Capability Information in the dictionary entry and if the Cause indicates an acceptance cause. | Manufacturer Assigned UE Radio Capability ID |
| UE Radio Access Capability Information | C | This IE shall be included to provide the UE Radio Access Capability Information if the Cause indicates an acceptance cause. | UE Radio Access Capability Information |
| Type Allocation Code | C | This IE shall be included to provide the Type Allocation Code in corresponding to the UE Radio Access Capability in the dictionary entry if the Cause indicates an acceptance cause. | Type Allocation Code |
| Software Version Number | C | This IE shall be included to provide the Software Version Number if available, which is used together with the TAC in corresponding to the UE Radio Access Capability in the dictionary entry if the Cause indicates an acceptance cause . . . Several IE with the same IE type may be present to represent multiple Software Version Numbers. If so, the TAC with different SVNs is corresponding to the same UE Radio Access Capability Information. | Software Version Number |
| $2^{nd}$ UE Radio Access Capability Information | O | | $2^{nd}$ UE Radio Access Capability Information |

The second UE radio capability IE referred to in Table 8 and Table 9 is encoded in a manner as shown in FIG. 7 in the attached Figures. The second UE radio capability IE is encoded as an octet string which contains the octet string of the UE radio capability IE. As shown in FIG. 7, the second UE radio capability IE is comprised in octets 5 to (n+4) IE.

Octets 1 to 2 give information of type (schematically shown as xx). Octets 3 to 4 give information of length (in this example length is schematically shown as n).

There now follows a description of changes to Nucmf TS29.673. Table 10 below shows a definition of type dictionary entry data (DicEntryData).

TABLE 10

| Attribute name | Data type | P | Cardinality | Description |
|---|---|---|---|---|
| plmnAssiUeRadioCapId | PlmnAssiUeRadioCapId | C | 0 . . . 1 | This IE shall include a PLMN Assigned UE Radio Capability ID if allocated in the dictionary entry. |
| manAssiUeRadioCapId | ManAssiUeRadioCapId | C | 0 . . . 1 | This IE shall include a Manufacturer Assigned UE Radio Capability ID if available in the dictionary entry. |
| typeAllocationCode | TypeAllocationCode | C | 0 . . . 1 | This IE shall contain the Type Allocation Code in corresponding to the UE Radio Access Capability in the dictionary entry. |
| swVersionNumber | array (SwVersionNumber) | C | 1 . . . N | This IE shall contain the Software Version Number(s) if available, together with the TAC in corresponding to the UE Radio Access Capability in the dictionary entry. |
| ueRadioCapability | RefToBinary Data | M | 1 | This IE shall be included to contain the UE Radio Capability Information encoded as OCTET STRING of UE Radio Capability IE as specified in clause 9.3.1.74 of 3GPP TS 38.413 [15]. |
| 2ndueRadioCapability | RefToBinaryData | O | 1 | This IE shall be included to contain the $2^{nd}$ UE Radio Capability Information encoded as OCTET STRING of UE Radio Capability IE specified in clause 9.3.1.x of 3GPP TS 38.413 [15]. |

NOTE:
The information in the dictionary entry which is included as the query parameter(s) in the request message shall not be present.

Of note in Table 10 is the presence of the second UE radio capability IE.

Table 11 below shows the definition of the dictionary entry create data (DicEntryCreateData).

TABLE 11

| Attribute name | Data type | P | Cardinality | Description |
| --- | --- | --- | --- | --- |
| typeAllocationCode | TypeAllocationCode | M | 1 | This IE shall contain the Type Allocation Code in corresponding to the UE Radio Access Capability in the dictionary entry. |
| swVersionNumber | SwVersionNumber | C | 0...1 | This IE shall contain the Software Version Number if available, together with the TAC in corresponding to the UE Radio Access Capability in the dictionary entry. |
| ueRadioCapability | RefToBinary Data | M | 1 | This IE shall be included to contain the UE Radio Capability Information encoded as OCTET STRING of UE Radio Capability IE specified in clause 9.3.1.74 of 3GPP TS 38.413 [15]. |
| 2ndueRadioCapability | RefToBinaryData | O | 1 | This IE shall be included to contain the 2nd UE Radio Capability Information encoded as OCTET STRING of UE Radio Capability IE specified in clause 9.3.1.x of 3GPP TS 38.413. |

Of note in Table 11 is the presence of the second UE radio capability IE. Regarding Tables 1 to 11, the Presence (or P) column represents each of the IEs is a mandatory (M) or an optional (O) and the IE type and reference column represents an IE type of the corresponding IE and reference sections of corresponding standard document, such as TS29.673, TS29.674, TS36.413, TS38.413, TS38.331 and/or TS36.331.

There now follows flow-charts looking at the described methods from the perspective of the UE; RAN node; CN node; and UCMF respectively.

There now follows a description of some methods according to the flow charts of FIGS. 8 to 11. In these flow charts, reference is made to the system of FIG. 1, for context. Nevertheless it will be understood that reference to an entity of FIG. 1 may be equally applicable to an equivalent entity in any of the subsequent Figures. For example, reference to UE 102 may also be applicable to UE 302 of FIG. 3, UE 402 of FIG. 4, UE 502 of FIG. 5, UE 602 of FIG. 6, and so-on. Likewise for other entities such as RAN node 106 (e.g. reference to RAN node 106 of FIG. 1 is equally applicable to RAN node 306 of FIG. 3, etc), RAN node 107, and so on for other entities.

UE

Figure 8:
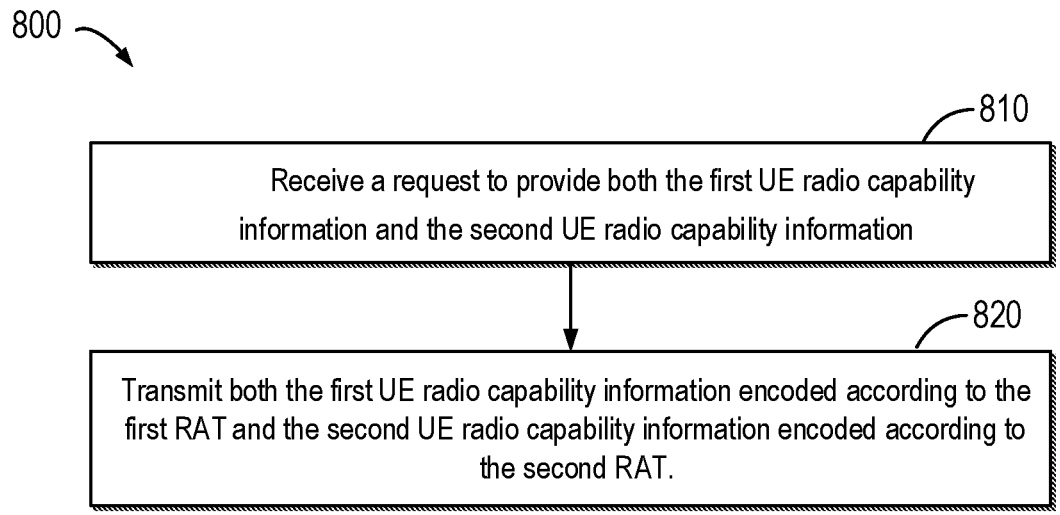
FIG. 8 shows a flow chart according to an example.

FIG. 8 is a flowchart of a method implemented at a UE according to some example embodiments of the present disclosure. The method can be implemented at the UE 102 as shown in FIG. 1, for example. For the purpose of discussion, the method 800 will be described with reference to FIG. 1.

At block 810, the UE 102 receives a request from RAN node 106 to provide both first UE radio capability information and second UE radio capability information.

At block 820, the UE 102 transmits both the first UE radio capability information encoded according to the first RAT, and the second UE radio capability information encoded according to the second RAT, to the RAN node 106. In one example, the first UE radio capability information is encoded according to TS 36.331, and the second UE radio capability information is encoded according to TS 38.331. In another example, the first UE radio capability information is encoded according to TS 38.331, and the second UE radio capability information is encoded according to TS 36.331.

In another example, where the UE 102 is a legacy UE without implementing the proposed UE method, the UE only provides the first UE radio capability information according to the first RAT.

RAN Node

Figure 9:
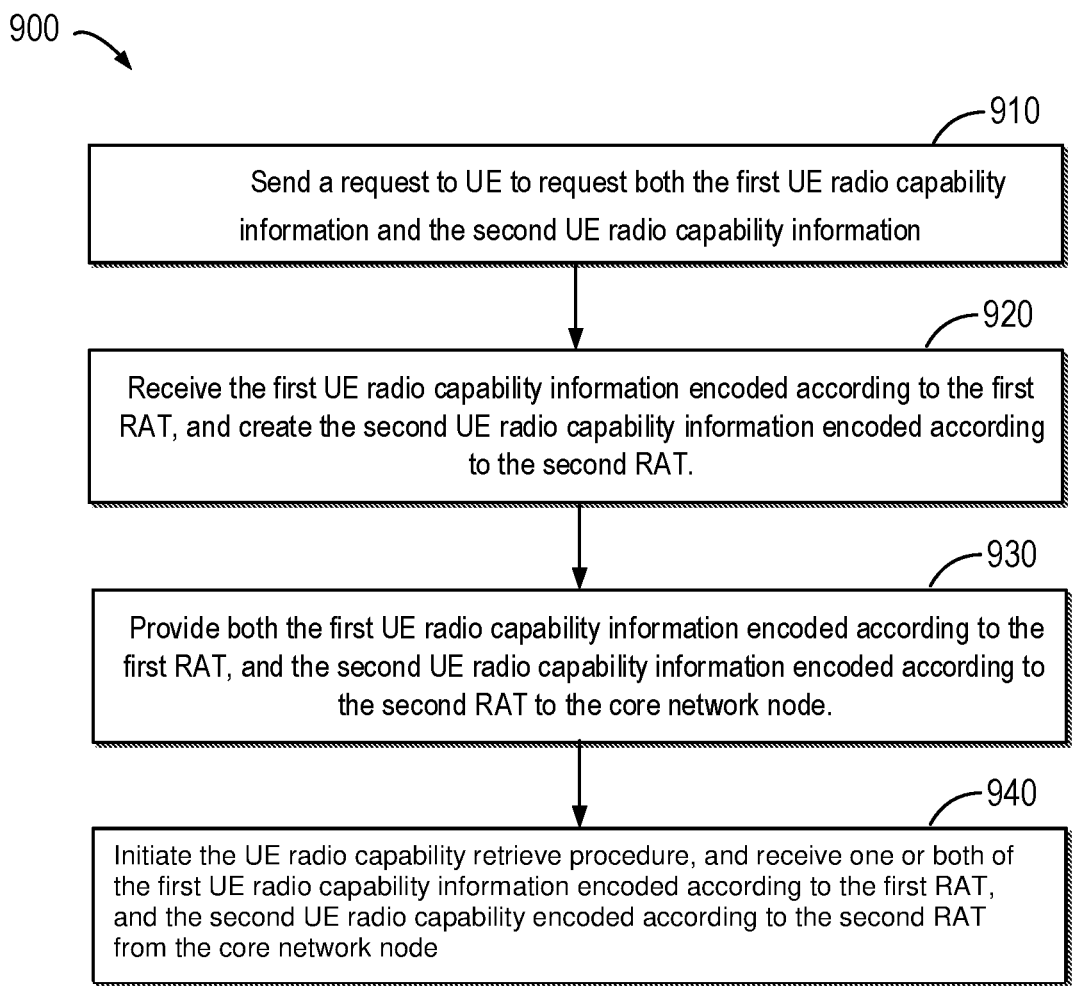
FIG. 9 shows a flow chart according to an example.

FIG. 9 is a flowchart of a method implemented at a RAN node according to some example embodiments of the present disclosure. The method can be implemented at the RAN node 106 as shown in FIG. 1, for example. For the purpose of discussion, the method 900 will be described with reference to FIG. 1.

At block 910, the RAN node 106 requests the UE 102 to provide both the first UE radio capability information and the second UE radio capability information. This may be implemented by the RRC signalling. In one example, the RRC UECapabilityEnquiry message can be enhanced with a flag to request the UE to provide both the first UE radio capability information and the second UE radio capability information.

At block 920, the UE 102 provides both the first UE radio capability information and the second UE radio capability information. In one example, the first UE radio capability information is encoded according to the first RAT, for example, LTE TS 36.331, and the second UE radio capability information is encoded according to the second RAT, for example, NR TS 38.331. In another example, the first UE radio capability information is encoded according to the first RAT, for example, NR TS 38.331, and the second UE radio capability information is encoded according to the second RAT, for example, LTE TS 36.331.

In another example, where the UE 102 is a legacy UE without implementing the proposed UE method, the UE only provides the first UE radio capability information according to the first RAT. The RAN node 106 generates the second UE radio capability information (for UE 102). The second UE radio capability information is encoded according to the second RAT. In one example, the first RAT is E-UTRA access and the second RAT is NR access. In another example, the first RAT is NR access and the second RAT is E-UTRA access.

At block 930, the RAN node 106 provides both the first UE radio capability information and the second UE radio capability information to the core network node. In one example, the core network node is a MME, and the RAN node provides both the first UE radio capability information and the second UE radio capability information to the core network node MME via S1 interface. For example, the S1AP UE CAPABILITY INFO INDICATION message is enhanced to include the second UE radio capability information.

In another example, the core network node is an AMF, and the RAN node 106 provides both the first UE radio capability information and the second UE radio capability information to the core network node AMF via N2 interface. For example, the NGAP UE RADIO CAPABILITY INFO INDICATION message is enhanced to include the second UE radio capability information.

The RAN node 106 receives a UE Radio Capability ID from the core network. The RAN node 106 store the association between the UE Radio Capability ID, and both the first UE radio capability information and the second UE radio capability information to the core network node.

At block 940, another RAN node 107 initiates the UE radio capability retrieve procedure, due to the lack of the mapping between the UE radio capability ID and the UE radio capability information. This may happen when the UE 102 is in handover, or the UE performed a cell reselection, to a target RAN node that does not have the mapping information. As a result of the retrieve procedure, the RAN node 107 receives one or both of the first UE radio capability information and the second UE radio capability information from the core network node. In one example, the first UE radio capability information is encoded according to the first RAT, for example, LTE TS 36.331, and the second UE radio capability information is encoded according to the second RAT, for example, NR TS 38.331. In another example, the first UE radio capability information is encoded according to the first RAT, for example, NR TS 38.331, and the second UE radio capability information is encoded according to the second RAT, for example, LTE TS 36.331. In another example, the first UE radio capability information aligns with the RAT type of RAN node 107.

Figure 10:
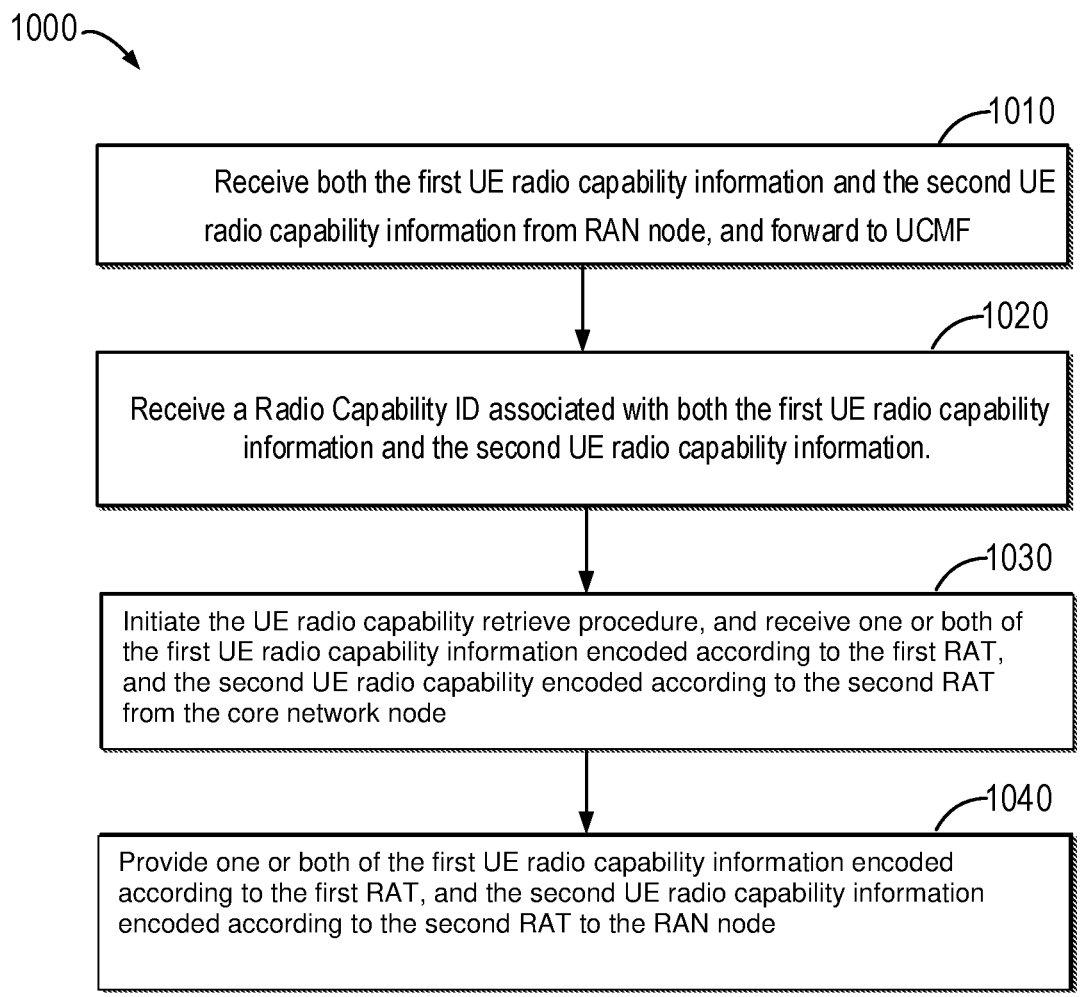
FIG. 10 shows a flow chart according to an example.

FIG. 10 is a flowchart of a method implemented at a CN node (e.g. AMF or MME) according to some example embodiments of the present disclosure. The method can be implemented at the CN node 132 as shown in FIG. 1. For example, the CN node 132 may comprise an AMF or an MME. For the purpose of discussion, the method 1000 will be described with reference to FIG. 1.

At block 1010, the CN node 132 receives both the first UE radio capability information and the second UE radio capability information from the RAN node 106. In one example, the core network node is a MME, and the RAN node 106 provides both the first UE radio capability information and the second UE radio capability information to the core network node MME via S1 interface. For example, the S1AP UE CAPABILITY INFO INDICATION message is enhanced to include the second UE radio capability information.

In another example, the core network node is an AMF, and the RAN node provides both the first UE radio capability information and the second UE radio capability information to the core network node AMF via N2 interface. For example, the NGAP UE RADIO CAPABILITY INFO INDICATION message is enhanced to include the second UE radio capability information.

The core network node 132 forwards the received first UE radio capability information and the second UE radio capability information to the UCMF.

At block 1020, the CN node 132 receives a UE Radio Capability ID associated with both the first UE radio capability information and the second UE radio capability information. The CN node 132 saves the mapping between the received UE radio capability ID, and both the first UE radio capability information and the second UE radio capability information. The CN node 132 sends the UE Radio Capability ID to the RAN node 106.

At block 1030, the CN node 132 initiates the UE capability retrieve procedure, due to the lack of mapping between the UE radio capability ID and the UE radio capability information. This may happen when the UE 102 is in handover, or the UE 102 performed a cell reselection to a target CN node that does not have the mapping information. As a result of the retrieve procedure, the CN node receives one or both the first UE radio capability information and the second UE radio capability information from the UCMF. In one example, the first UE radio capability information is encoded according to the first RAT, for example, LTE TS 36.331, and the second UE radio capability information is encoded according to the second RAT, for example, NR TS 38.331. In another example, the first UE radio capability information is encoded according to the first RAT, for example, NR TS 38.331, and the second UE radio capability information is encoded according to the second RAT, for example, LTE TS 36.331.

At block 1040, the CN node 132 provides one or both the first UE radio capability information and the second UE radio capability information to the RAN node. In one example, the first UE radio capability information is encoded according to the first RAT, for example, LTE TS 36.331, and the second UE radio capability information is encoded according to the second RAT, for example, NR TS 38.331. In another example, the first UE radio capability information is encoded according to the first RAT, for example, NR TS 38.331, and the second UE radio capability information is encoded according to the second RAT, for example, LTE TS 36.331. In another example, the first UE radio capability information aligns with the RAT type of RAN node.

In another example, the CN node 132 may only provide one of the first UE radio capability information and the second UE radio capability information to the RAN node, for example, according to the RAT type of the RAN node. The provided UE radio capability information aligns with the RAT type of RAN node.

Figure 11:
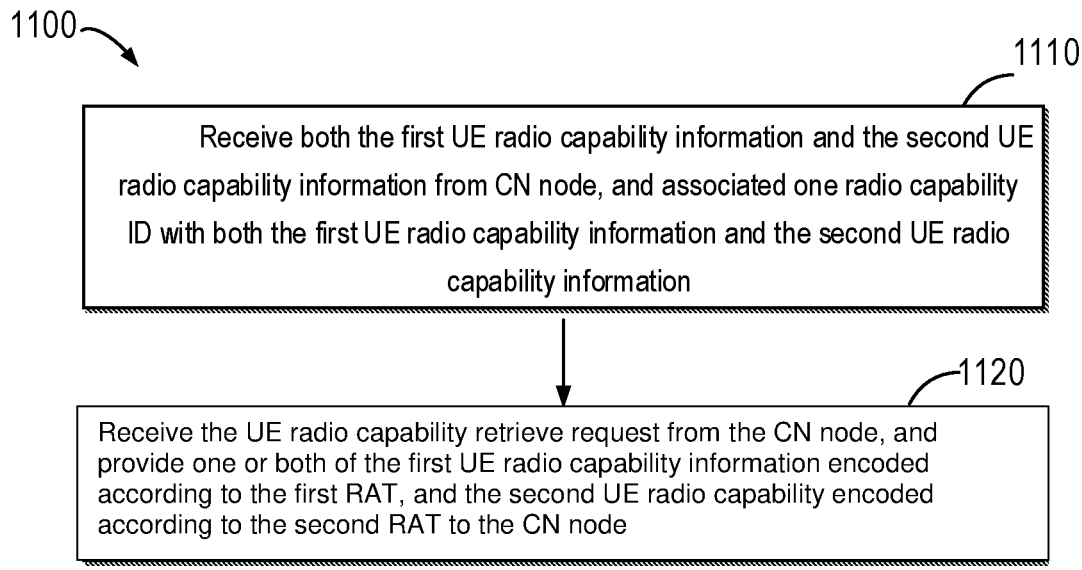
FIG. 11 shows a flow chart according to an example.

FIG. 11 is a flowchart of a method implemented at a UCMF according to some example embodiments of the present disclosure. The method can be implemented at the UCMF 134 as shown schematically in FIG. 1. For the purpose of discussion, the method 1100 will be described with reference to FIG. 1.

At block 1110, the UCMF node 134 receives both the first UE radio capability information and the second UE radio capability information from the CN node 132. In one example, the core network node is a MME, and the UCMF 134 receives both the first UE radio capability information and the second UE radio capability information from the core network node MME via S17 interface. For example, the S17 Create Dictionary Entry Request message is enhanced to include the second UE radio capability information.

In another example, the core network node 132 is an AMF, and the UCMF 134 receives both the first UE radio capability information and the second UE radio capability information from the core network node AMF via N55 interface. For example, the DicEntryData is enhanced to include the second UE radio capability information.

The UCMF 134 associates a UE Radio Capability ID with both the first UE radio capability information and the second UE radio capability information. The UE Radio Capability ID is provided to core network node 132, the RAN node 106 and the UE 102.

At block 1120, the UCMF 134 receives the UE capability retrieve request from the core network node 132. As a result of the retrieve procedure, the UCMF provides one or both the first UE radio capability information and the second UE radio capability information from the UCMF. In one example, the first UE radio capability information is encoded according to the first RAT, for example, LTE TS 36.331, and the second UE radio capability information is encoded according to the second RAT, for example, NR TS 38.331. In another example, the first UE radio capability information is encoded according to the first RAT, for example, NR TS 38.331, and the second UE radio capability information is encoded according to the second RAT, for example, LTE TS 36.331.

In another example, the UCMF node 134 may only provide one of the first UE radio capability information and the second UE radio capability information to the core network node 132 (AMF or MME).

Figure 12:
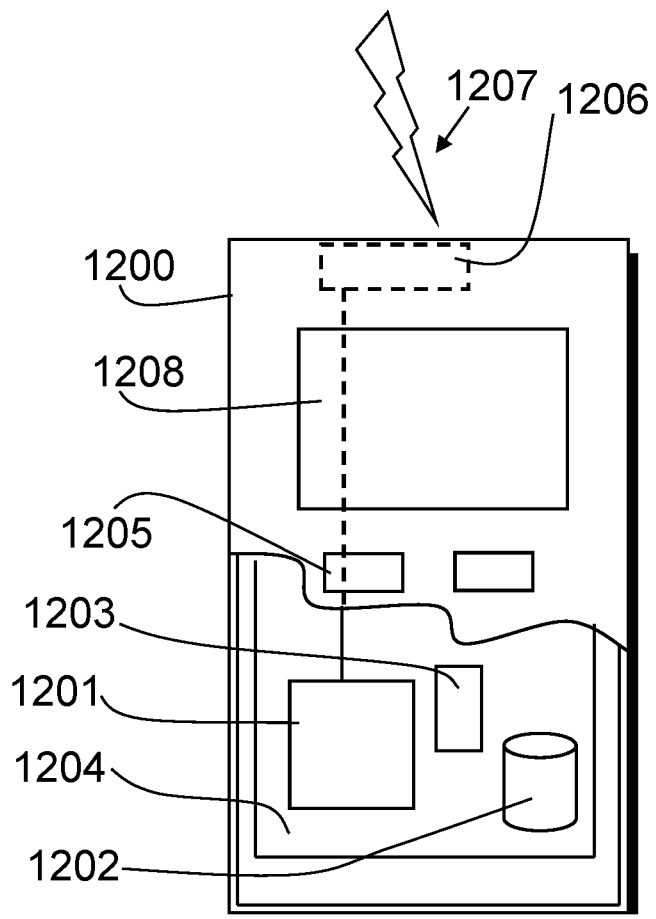
FIG. 12 shows a communication device according to an example.

A possible wireless communication device which may be used in some examples will now be described in more detail with reference to FIG. 12 showing a schematic, partially sectioned view of a communication device 1200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 1200 may receive signals over an air or radio interface 1207 via appropriate apparatus for receiving and may transmit signals via appropriate apparatus for transmitting radio signals. In FIG. 12 transceiver apparatus is designated schematically by block 1206. The transceiver apparatus 1206 may be provided for example by means of a radio part and associated antenna arrangement. The antenna arrangement may be arranged internally or externally to the wireless device.

A wireless device is typically provided with at least one data processing entity 1201, at least one memory 1202 and other possible components 1203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 1204. The user may control the operation of the wireless device by means of a suitable user interface such as key pad 1205, voice commands, touch sensitive screen or pad, combinations thereof or the like. A display 1208, a speaker and a microphone can be also provided. Furthermore, a wireless communication device may comprise appropriate connectors (either wired or wireless) to other devices and/or for connecting external accessories, for example hands-free equipment, thereto.

Figure 13:
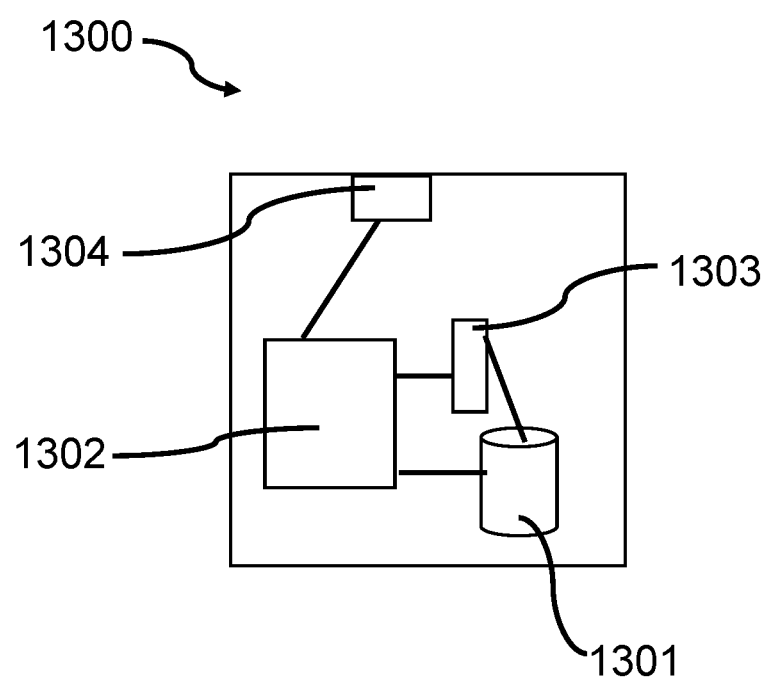
FIG. 13 shows a control apparatus according to an example.

FIG. 13 shows an example of a control apparatus for a communication system, for example to be coupled to and/or for controlling a station of an access system, such as a RAN node, e.g. a base station such as an eNB or gNB, a central unit of a cloud architecture or a node of a core network such as an MME or AMF or S-GW, a scheduling entity such as a spectrum management entity, or a server or host. The control apparatus may also comprise, for example, a UCMF. The control apparatus may be integrated with or external to a node or module of a core network or RAN. In some examples, base stations comprise a separate control apparatus unit or module. In other examples, the control apparatus can be another network element such as a radio network controller or a spectrum controller. In some examples, each base station may have such a control apparatus as well as a control apparatus being provided in a radio network controller. The control apparatus 1300 can be arranged to provide control on communications in the service area of the system. The control apparatus 1300 comprises at least one memory 1301, at least one data processing unit 1302, 1303 and an input/output interface 1304. Via the interface the control apparatus can be coupled to a receiver and a transmitter of a base station. The receiver and/or the transmitter may be implemented as a radio front end or a remote radio head. For example the control apparatus 1300 or processor 1301 can be configured to execute an appropriate software code to provide the control functions.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A radio access network (RAN) node comprising:
at least one processor; and
at least one memory including program code, the at least one memory and computer program code configured to, with the at least one processor, cause the RAN to perform:
   receiving, by the RAN node, first radio capability information from a user equipment, the first radio capability information in a format of a first radio access technology;
   generating, by the RAN node, second radio capability information of the user equipment based on the first radio capability information, wherein the second radio capability information is generated in a format of a second radio access technology; and
   sending, by the RAN node to a core network node, the first radio capability information being in the format of the first radio access technology and the second radio capability information being in the format of the second radio access technology.

2. The RAN node according to claim 1, wherein the core network node comprises a Mobility Management Entity or an Access and Mobility Management Function.

3. The RAN node according to claim 1, wherein the RAN node comprises a source radio access node of the user equipment, the RAN node operating according to the first radio access technology.

4. The RAN node according to claim 1, wherein the first radio access technology is one of a long term evolution access technology and a new radio access technology, and the second radio access technology is the other of the long term evolution access technology and the new radio access technology.

5. The RAN node according to claim 1, wherein the at least one memory and computer program code are further configured to, with the at least one processor, cause the RAN node to perform:
   receiving a radio capability identifier of the user equipment from the core network node, the radio capability identifier associated with both the first radio capability information and the second radio capability information.

6. A method comprising:
receiving, by a radio access network (RAN) node, first radio capability information from a user equipment, the first radio capability information being in a format of a first radio access technology;
generating, by the RAN node, second radio capability information of the user equipment based on the first radio capability information, wherein the second radio capability information is generated in a format of a second radio access technology; and
sending, by the RAN node to a core network node, the first radio capability information being in the format of the first radio access technology and the second radio capability information being in the format of the second radio access technology.

7. The method according to claim 6, wherein the core network node comprises a Mobility Management Entity or an Access and Mobility Management Function.

8. The method according to claim 6, wherein the RAN node comprises a source radio access node of the user equipment, the RAN node operating according to the first radio access technology.

9. The method according to claim 6, wherein the first radio access technology is one of a long term evolution access technology and a new radio access technology, and the second radio access technology is the other of the long term evolution access technology and the new radio access technology.

10. The method according to claim 6, further comprising:
receiving, by the RAN node a radio capability identifier of the user equipment from the core network node, the radio capability identifier associated with both the first radio capability information and the second radio capability information.

11. A non-transitory computer readable medium comprising program instructions for causing a radio access network (RAN) node to perform at least:
receiving, by the RAN node, first radio capability information from a user equipment, the first radio capability information in a format of a first radio access technology;
generating, by the RAN node, second radio capability information of the user equipment based on the first radio capability information, wherein the second radio capability information is generated in a format of a second radio access technology; and
sending, by the RAN node to a core network node, the first radio capability information being in the format of the first radio access technology and the second radio capability information being in the format of the second radio access technology.

12. The non-transitory computer readable medium according to claim 11, wherein the core network node comprises a Mobility Management Entity or an Access and Mobility Management Function.

13. The non-transitory computer readable medium according to claim 11, wherein the RAN node comprises a source radio access node of the user equipment, the RAN node operating according to the first radio access technology.

14. The non-transitory computer readable medium according to claim 11, wherein the first radio access technology is one of a long term evolution access technology and a new radio access technology, and the second radio access technology is the other of the long term evolution access technology and the new radio access technology.

15. The non-transitory computer readable medium according to claim 11, wherein non-transitory computer readable medium further comprises program instructions to perform:
receiving a radio capability identifier of the user equipment from the core network node, the radio capability identifier associated with both the first radio capability information and the second radio capability information.

\* \* \* \* \*